US006714604B1

(12) United States Patent
Tsurumi et al.

(10) Patent No.: US 6,714,604 B1
(45) Date of Patent: Mar. 30, 2004

(54) RECEIVER

(75) Inventors: Hiroshi Tsurumi, Kanagawa-ken (JP); Hiroshi Yoshida, Kanagawa-ken (JP); Shoji Otaka, Kanagawa-ken (JP); Hiroshi Tanimoto, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 623 days.

(21) Appl. No.: 09/604,838

(22) Filed: Jun. 27, 2000

(30) Foreign Application Priority Data

Jun. 28, 1999  (JP) .......................... 11-182311
Oct. 27, 1999  (JP) .......................... 11-305953

(51) Int. Cl.[7] .............................................. H04B 1/26
(52) U.S. Cl. ...................................... 375/329; 455/205
(58) Field of Search ................................ 375/316, 322, 375/329, 350, 260, 285, 346, 261, 340; 370/203, 204, 206, 208, 210; 455/324, 205, 310, 340

(56) References Cited

U.S. PATENT DOCUMENTS 6,297,637 B1 * 10/2001 Feld et al. .................... 324/322
6,334,051 B1 * 12/2001 Tsurumi et al. ............... 455/324
6,337,885 B1 *  1/2002 Hellberg ....................... 375/316
6,545,516 B2 *  4/2003 Ylamurto et al. ............ 327/113

OTHER PUBLICATIONS

Sansen et al., "A 900–mV Low–Power DS A/D Converter with 77 dB Dynamic Range", IEEE Journal of Solid–State Circuits, vol. 33, No. 12, pp. 1887–1897.*

Fong et al., "Monolithic RF Active Mixer Design", IEEE 1999 Transactions on Circuits and Systems—II: Analog and Digital Signal Processing, vol. 46, No. 3, pp. 231–239.*

P.R. Gray, et al., "Future Directions in Silicon ICS For RF Personal Communications," IEEE 1995 Custom Integrated Circuits Conference, 1995, pp. 83–90.

Jan Crols, et al., "A Single Chip 900 MHZ CMOS Receiver Front–End With A High Performance Low–IF Topology," IEEE Journal of Solid–State Circuits, vol. 30, No. 12, Dec. 1995, pp. 1483–1492.

Jan Crols, et al., "Low–IF Topologies for High Performance Analog Front Ends of Fully Integrated Receivers," IEEE Transactions on Circuits and Systems–II: Analog and Digital Signal Processing, vol. 45, No. 3, Mar. 1998, pp. 269–282.

* cited by examiner

*Primary Examiner*—Mohammad H. Ghayour
*Assistant Examiner*—Dung X. Nguyen
(74) *Attorney, Agent, or Firm*—Oblon, Spivak, McClelland, Maier & Neustadt, P.C.

(57) ABSTRACT

An orthogonal demodulating section converts the frequency of received signals to the lower range in batch after rejecting an image band thereof by an RF filter. An image rejecting section rejects the image band of the orthogonally converted output. It allows an enough image rejecting degree to be obtained. An A/D converter section converts the whole range into a digital signal and an orthogonal demodulating section demodulates a desirable channel by means of digital processing. Then, a channel selecting section selects and outputs the desirable channel. It then allows wide-bands to be received in batch, flexible processing to be achieved by the digital processing and an enough image rejecting degree to be obtained.

6 Claims, 41 Drawing Sheets

ANALOG ORTHOGONAL DEMODULATION

DIGITAL ORTHOGONAL DEMODULATION

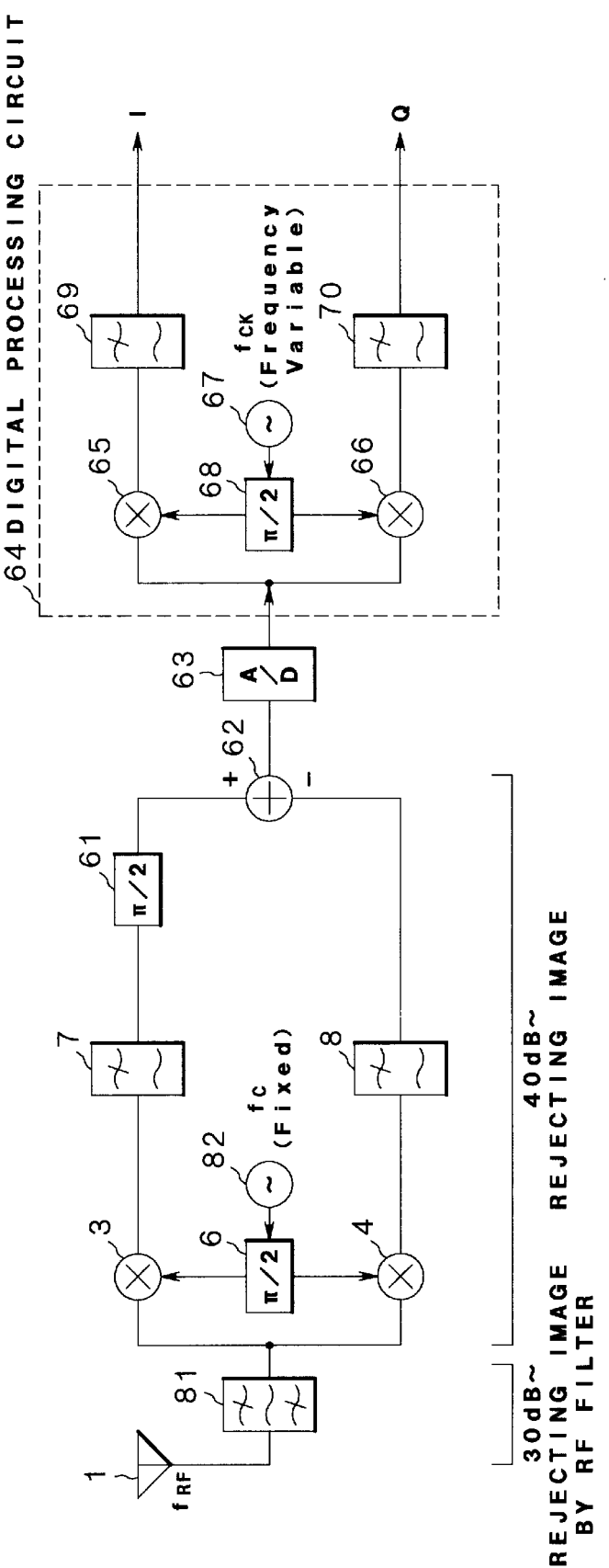

REJECTING IMAGE
BY RF FILTER

LOCAL OSCILLATING
FREQUENCY
(FIXED LOCAL OSCILLATOR)

ANALOG ORTHOGONAL
DEMODULATION,
A/D CONVERSION,
REJECTING IMAGE

LOCAL OSCILLATING FREQUENCY
(VARIABLE LOCAL OSCILLATOR)

DIGITAL ORTHOGONAL
DEMODULATION

RECEIVER

BACKGROUND OF THE INVENTION

1. Field of the Invention

The present invention relates to a wide-band receiver which receives intended system bands in batch and selects a channel by means of digital processing.

2. Related Art Statement

Research and development on various radio communication systems have been conducted in the field of data transmission and the like lately to deal with the increase of an amount of information to be transmitted and to accommodate to characteristics of each radio communication system. Such plurality of radio communication systems transmit a plurality of channels mixedly.

FIG. 1A is a circuit diagram showing the related art of a receiver which receives and demodulates data of one communication system among such various radio communication systems. This device has been disclosed in First Document (P. R. Gray and R. G. Mayer, "Future directions of Silicon IC's for RF personal communications," Proc. Custom Integrated Circuits Conference '95, pp. 83–90, 1995).

The signal received by the device of FIG. 1A is what data is multiplexed and transmitted by modulating into a high-frequency signal band by orthogonal axes (I, Q axes). A high-frequency signal (RF signal) of such high frequency fRF is inducted at an antenna 1. The band of the RF signal is limited by a band-pass filter 2 which is an RF filter and is supplied to analog mixers 3 and 4 which compose an orthogonal demodulating section.

A local oscillator 5 outputs a local oscillating output whose oscillating frequency fC is fixed to a phase shifter 6 to convert the RF signal into a base-band signal. The phase shifter 6 shifts the phase of the local oscillating output by $\pi n/2$ and supplies the local oscillating outputs which are orthogonal to each other to the mixers 3 and 4. The mixers 3 and 4 convert the frequency to that of the base-band by multiplying the inputted RF signal with the local oscillating outputs.

The outputs of the mixers 3 and 4 are limited by analog low-pass filters 7 and 8 and are supplied to analog multipliers 9 through 12 which compose an orthogonal demodulating section. A local oscillating output from a local oscillator 13 is phase-shifted by $\pi/2$ by a phase shifter 14 and is inputted to the multipliers 9 through 12. The local oscillating frequency fCK of the local oscillator 13 is variable. That is, the local oscillating output from the local oscillator 13 is set at frequency for demodulating a communication system (channel) to be selected.

The multipliers 9 and 11 multiply the local oscillating output which is orthogonal each other to the output of the low-pass filter 7 and the multipliers 10 and 12 multiply the local oscillating output which is orthogonal each other to the output of the low-pass filter 8. An I axis signal may be obtained by adding the outputs of the multipliers 9 and 10 by an analog adder 15 and a Q axis signal may be obtained by adding the outputs of the multipliers 11 and 12 by an analog adder 16. Image components may be rejected by the adding process of the adders 15 and 16.

Analog low-pass filters 17 and 18 limit the band of the outputs of the adders 15 and 16 and supply them to A/D converters 19 and 20. The A/D converters 19 and 20 convert the analog signals of the I and Q axes into digital I and Q signals and output them.

FIG. 1B is a block diagram representing the circuit diagram of FIG. 1A.

That is, as it is apparent by comparing FIG. 1A with FIG. 1B, an RF filter 21 corresponds to the band-pass filter 2, an orthogonal demodulating section 22 corresponds to the mixers 3 and 4 and filters 7 and 8, a fixed local oscillating section 23 corresponds to the local oscillator 5 and the phase shifter 6, an orthogonal demodulating section 24 corresponds to the multipliers 9 through 12, a variable local oscillating section 25 corresponds to the local oscillator 13 and the phase shifter 14, an image rejecting section 26 corresponds to the adders 15 and 16, a channel selecting section 27 corresponds to the filters 17 and 18 and an A/D converter section 28 corresponds to the A/D converters 19 and 20.

That is, the device shown in FIG. 1B is arranged so as to select a desirable wave by the analog channel selecting section 27 after rejecting the image component of the output of the orthogonal demodulating section 24 by the image rejecting section 26 and to output by converting it into digital signals by the A/D converter section 28.

However, the image rejecting precision is low due to the incompleteness of the analog circuit of the mixers 3 and 4, the filters 7 and 8, the phase shifter 6 and the analog multipliers 9, 10, 11 and 12. Further, such arrangement lacks flexibility in changing bands and cutoff in correspondence to a plurality of systems because the filters composing the channel selecting section 27 are analog filters 17 and 18.

FIG. 2A is a circuit diagram showing another exemplary related art of such receiver. This device has been disclosed in Second Document (J. Crols and M. Steyaert, "A single-chip 900 MHz CMOS receiver front-end with a high performance low-IF topology" IEEE J. Solid-State Circuits, vol. 30, No. 12, pp. 1483–1492, 1995).

FIG. 2B is a block diagram representing the circuit diagram of FIG. 2A. The device in FIGS. 2A and 2B is characterized in that A/D converters 31 and 32 which correspond to an A/D converter section 46 are provided before multipliers 33 through 36 which correspond to an orthogonal demodulating section 47. The oscillating frequency fC of a local oscillator 30 is variable. The local oscillator 30 composing a variable local oscillating section 45 outputs an oscillating output of oscillating frequency corresponding to a channel to be selected. This oscillating frequency sets the output of the mixers 3 and 4 at frequency corresponding to fixed oscillating frequency fCK of a local oscillator 37 composing a fixed local oscillating section 48.

The outputs of the low-pass filters 7 and 8 are converted into digital signals by the A/D converters 31 and 32 and are then supplied to the digital multipliers 33 through 36 composing an orthogonal demodulating section 47. The oscillating output of the local oscillator 37 whose phase has been shifted by $\pi/2$ by a phase shifter 38 is given to the digital multipliers 33 through 36. Signals of I and Q axes may be obtained by the multipliers 33 through 36. The output of the multipliers 33 and 34 and the output of the multipliers 35 and 36 are subtracted respectively by adders 39 and 40 composing an image rejecting section 49 and rejected image components are supplied to low-pass filters 41 and 42. The digital low-pass filters 41 and 42 composing a channel selecting section 50 output by limiting the band of the signals of I and Q axes.

The frequency of the variable local oscillating section 45 (local oscillator 30) is changed in selecting a desirable channel in this arrangement. That is, it is provided with the function of selecting a channel by the orthogonal demodulating section 22 and the variable local oscillating section 45. However, because the variable local oscillating section 45 is an analog high-frequency oscillator, it has been difficult to change the frequency programmably and to vary the frequency per channel interval across a wide-band. Further, because the oscillating frequency of the local oscillator 30 exists within the band of the desirable channel in this arrangement, it has been unable to provide the RF filter 21, differing from the case of FIGS. 1A and 1B.

Accordingly, the image rejecting degree which has been realized by the RF filter 21 cannot be obtained, thus degrading the image rejecting degree of the whole receiver system.

FIG. 3A is a circuit diagram showing another exemplary related art of the receiver. This device has been disclosed in Third Document (J. Crols and M. Steyaert, "Low-IF topologies for high-performance analog front ends of fully integrated receivers," IEEE Trans. Circuits & Syst., vol. 45, No. 3, pp. 269–282).

FIG. 3B is a block diagram representing the circuit diagram of FIG. 3A. The device shown in FIG. 3A is what the low-pass filters 41 and 42 in the device of FIG. 2A are eliminated and band-pass filters 51 and 52 are adopted instead of the low-pass filters 7 and 8, respectively. The band-pass filters 51 and 52 select a channel together with the mixers 3 and 4 and the local oscillator 30. That is, the device in FIG. 3A selects a desirable channel by the analog band-pass filters 51 and 52 after setting the frequency of the local oscillator 30 at the desirable channel and demodulating orthogonally similarly to the device in FIG. 2A.

This arrangement disallows the image rejecting degree to be obtained by the RF filter similarly to the device in FIG. 2B and the band width of the band-pass filters 51 and 52 must be varied in analog when channel bands are different.

Thus, the receivers of the related art shown in FIGS. 1A through 3A have realized the selection of a channel by means of the analog circuits. By the way, it has come to be required to be able to receive signals of a plurality of systems by one terminal lately. It is desirable to select a channel by means of digital processing to flexibly accommodate with each system because a band width per channel and characteristics of a waveform shaping filter are different among different systems.

Due to that, there has been required a wide-band receiver which receives the whole bands of radio communication systems to be received in batch. A direct conversion receiver has been drawing an attention lately as a radio scheme for realizing the wide-band receiver.

FIG. 4 is a circuit diagram showing the structure of a related art of the receiver considered to be such direct conversion scheme receiver.

A high-frequency signal received by an antenna 1 is multiplied with a carrier wave of fixed oscillating output supplied from a local oscillator 5 via a phase shifter 6 by mixers 3 and 4 distributed into two systems and is frequency-converted into a base-band frequency band in batch per system band containing a desirable wave to be received.

The oscillating frequency of the local oscillator 5 of fixed oscillating output is set within the frequency band of the system to be received.

The output of the local oscillator 5 is supplied to the mixers 3 and 4, respectively, via the phase shifter 6.

Accordingly, signals of two systems of I and Q frequency-converted into the base-band have a phase difference of π/2 from each other. The band of the base-band signals of the two systems are limited by anti-aliasing low-pass filters 7 and 8. Then, a π/2 phase shifter 61 shifts the phase of only one channel by π/2 and an adder 62 subtracts them to reject an image component.

An A/D converter 63 converts the output of the adder 62 in batch per system band. Then, a digital processing section 64 comprising digital multipliers 65 and 66, a digital π/2 phase shifter 68, a local oscillator 67 of variable oscillating output and digital filters 69 and 70 carries out digital orthogonal demodulating operations. The digital filters 69 and 70 digitally select a desirable signal from the orthogonal demodulated outputs from the multipliers 65 and 66, thus obtaining I and Q signals.

Next, the above-mentioned operations will be explained on a frequency axis by using FIGS. 5A through 5C.

Now assume a case of receiving eight channels in batch in a radio communication system including signals of the eight channels of channel 1 (ch1) through channel 8 (ch8) and of selecting only hatched ch6 as a desirable wave. When the oscillating frequency of the local oscillator 5 is set at the frequency between ch4 and ch5 as shown in FIG. 5A, ch3 turns out to be an image signal (grid pattern) for ch6.

The output of the adder 62 turns out as shown in FIG. 5B by the orthogonal demodulation carried out by the multipliers 3 and 4. That is, the receiver receives the system bands in batch. In this case, the image signal ch3 is rejected. Next, the receiver A/D- converts the signal shown in FIG. 5B and then orthogonally demodulates by the digital processing section 64. In this case, the oscillating frequency of the variable local oscillator 67 is tuned to the desirable channel. That is, it is tuned to the frequency of ch6. Thus, the orthogonal demodulated output shown in FIG. 5C is obtained from the digital processing section 64. The desirable channel ch6 becomes a DC (direct-current) component to be selected by the digital filters 69 and 70. Thus, the device in FIG. 4 allows the desirable channel to be selected digitally while receiving the system bands in batch.

However, actually, the analog orthogonal demodulating section does not operate ideally due to the unbalance of the phase of amplitude between the I and Q channels of the mixers 3 and 4 and the low-pass filters 7 and 8 composing the analog orthogonal demodulating section. Therefore, there has been a problem that the rejection of image component is not carried out fully.

FIGS. 6A through 6C are frequency spectrum diagrams for explaining this problem. FIGS. 6A through 6C correspond to FIGS. 5A through 5C, respectively. Because the analog orthogonal demodulating section does not operate ideally, the image signal (grid pattern) of ch3 remains in the output of the adder 62 while superimposing to the desirable channel ch6 (hatched channel) as shown in FIG. 6B. The ratio of the component of ch6 to the image signal component of ch3 is the image rejecting degree as shown in FIG. 6B. After all, the image signal component remains in the orthogonal demodulated output of the desirable channel (FIG. 6C).

In case of a circuit of 2 GHz band for example, only image rejecting degree of around 30 dB can be realized in the adder 62 which corresponds to the image rejecting section. A value of 60 to 70 dB is required as the image rejecting degree in normal radio communication systems. Therefore, it is unable to obtain the image rejecting characteristics fully depending on a system by the arrangement of FIG. 4.

Thus, the related arts of the receivers described above have had problems that the precision of the orthogonal demodulator is relatively low due to the incompleteness of the analog section and that it is unable to obtain the image rejecting characteristics fully when the wide-band receiver which receives the bands of systems to be received in batch and selects a channel by means of digital processing is to be realized.

SUMMARY OF THE INVENTION

Accordingly, it is an object of the invention to provide a receiver which is capable of fully obtaining an image rejecting degree even in selecting a channel by means of digital processing by receiving system bands in batch.

An inventive receiver comprises a filter which outputs an input signal containing a plurality of channels by rejecting an image band in a frequency converting process; a frequency converter having an analog orthogonal demodulator and converting the frequency of the plurality of channels into the low range in batch when the input signal whose image band has been rejected by the filter is inputted; an image rejecting device which rejects and outputs the image band of the signal of the plurality of channels whose frequency has been converted by the frequency converter; an A/D converter which converts the signal of the plurality of channels which is the output of the image rejecting device into a digital signal; and a channel selector which selects a desirable channel out of the signals of the plurality of channels contained in the output of the A/D converter by means of digital processing.

Another inventive receiver comprises a filter which outputs an input signal containing a plurality of channels by rejecting an image band in a frequency converting process; a frequency converter having an analog orthogonal demodulator and converting the frequency of the plurality of channels into the low range in batch when the input signal whose image band has been rejected by the filter is inputted; an A/D converter which converts the signals of the plurality of channels whose frequency have been converted by the frequency converter into a digital signal; a channel selector which selects a desirable channel out of the signals of the plurality of channels contained in the output of the A/D converter by means of digital processing; and an image rejecting device which rejects the image band before, during or after the digital processing of the channel selector.

The specific nature of the invention, as well as other objects and advantages thereof, will clearly appear from the following description and from the accompanying drawings.

BRIEF DESCRIPTION OF THE DRAWINGS

FIG. 12 is a circuit diagram showing another embodiment of the invention;

DESCRIPTION OF THE PREFERRED EMBODIMENTS

Embodiments of the present invention will be explained in detail below with reference to the drawings. FIGS. 7 through 10 are block diagrams showing one embodiment of an inventive receiver.

Figure 7:
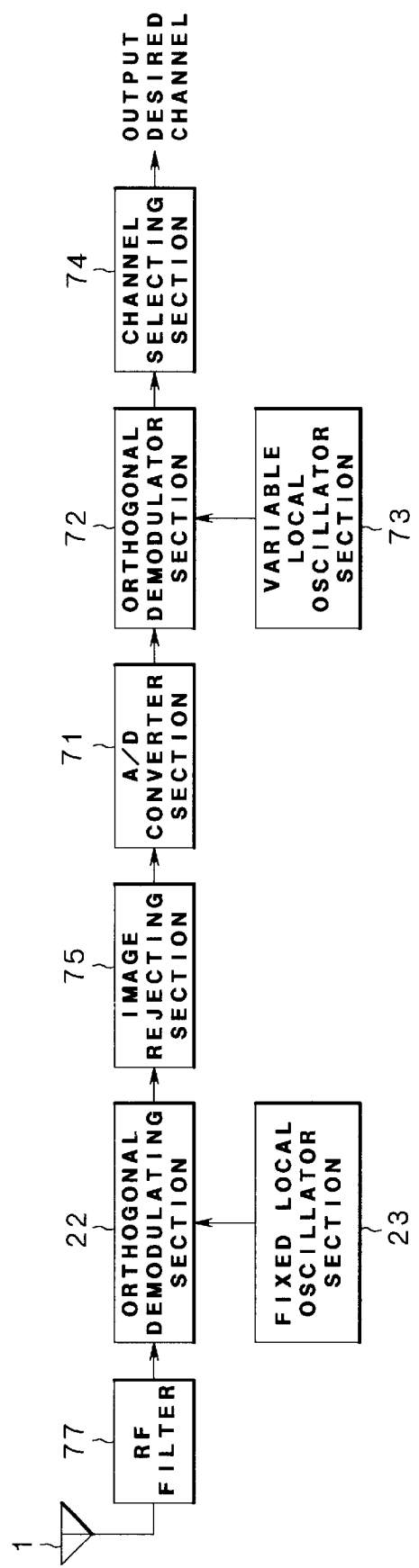
FIG. 7 is a block diagram showing one embodiment of an inventive receiver.

In FIG. 7, a high-frequency signal is induced at an antenna 1. A plurality of channels of a plurality of systems are contained in the signals received by the antenna 1. The high-frequency signal induced at the antenna 1 is supplied to an RF filter 77. The RF filter 77 rejects an image component to a desirable wave. The output of the RF filter 77 is supplied to an orthogonal demodulating section 22.

The orthogonal demodulating section 22 is constructed in analog to which a reference signal (local oscillating output) for orthogonal demodulation is given from a fixed local oscillating section 23. Oscillating frequency of the fixed local oscillating section 23 is set at frequency out of the range of signal band of a system to be received. The orthogonal demodulating section 22 converts the whole channels of the inputted RF signals into a low frequency band, e.g., frequency in the vicinity of DC by using the local oscillating output.

The output of the orthogonal demodulating section 22 is supplied to an image rejecting section 75. The image rejecting section 75 is a section following the orthogonal demodulating process of the orthogonal demodulating section 22 and outputs the output of the orthogonal demodulating section 22 to an A/D converter section 71 by rejecting the image component thereof.

The A/D converter section 71 converts the inputted signal into a digital signal to be supplied to an orthogonal demodulating section 72. The orthogonal demodulating section 72 is constructed in digital and a local oscillating output which is a reference signal for orthogonal demodulation is given thereto from a variable local oscillating section 73. The variable local oscillating section 73 outputs an oscillating output of oscillating frequency corresponding to the desirable channel. The orthogonal demodulating section 72 orthogonally demodulates the desirable channel from the inputted signal by using the local oscillating output to output to a channel selecting section 74. The channel selecting section 74 is constructed in digital and selects and outputs a signal of the desirable channel from the output of the orthogonal demodulating section 72. The channel selecting section 74 is constructed by a digital filter for example.

Figure 8:
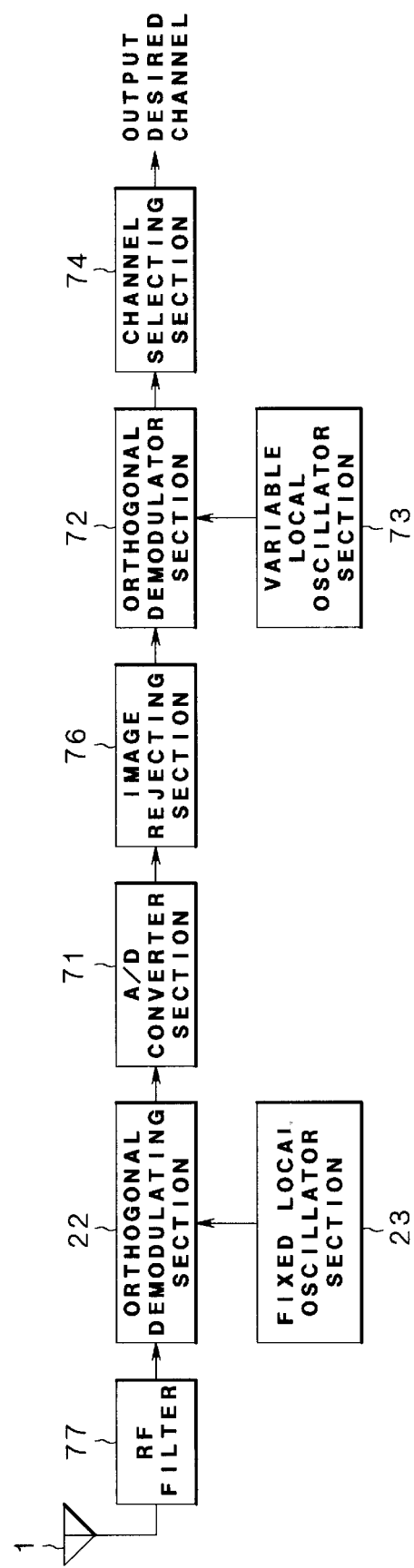
FIG. 8 is a block diagram showing one embodiment of the inventive receiver.
Figure 9:
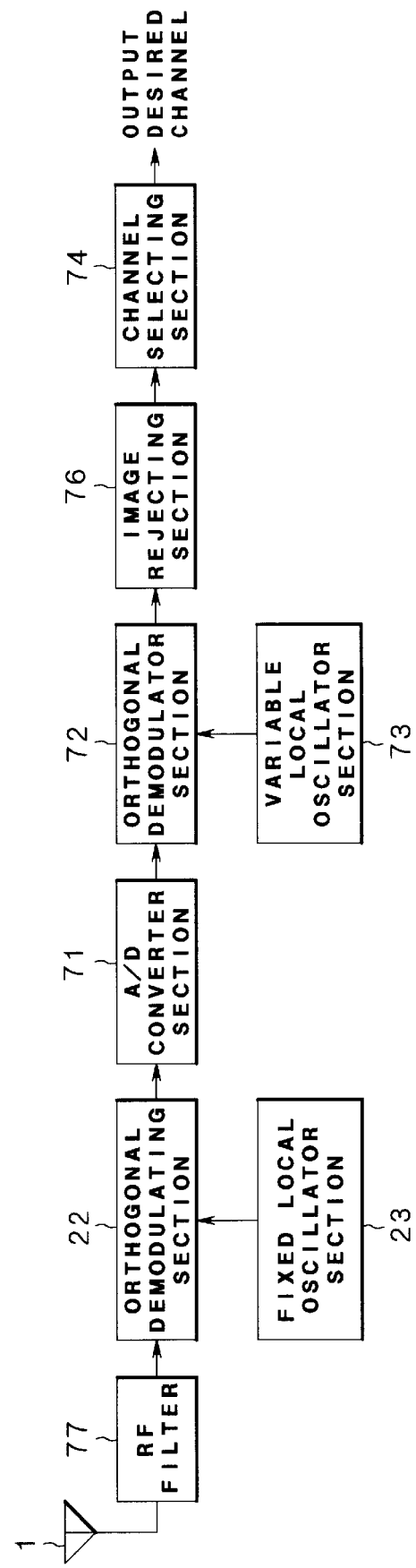
FIG. 9 is a block diagram showing one embodiment of the inventive receiver.
Figure 10:
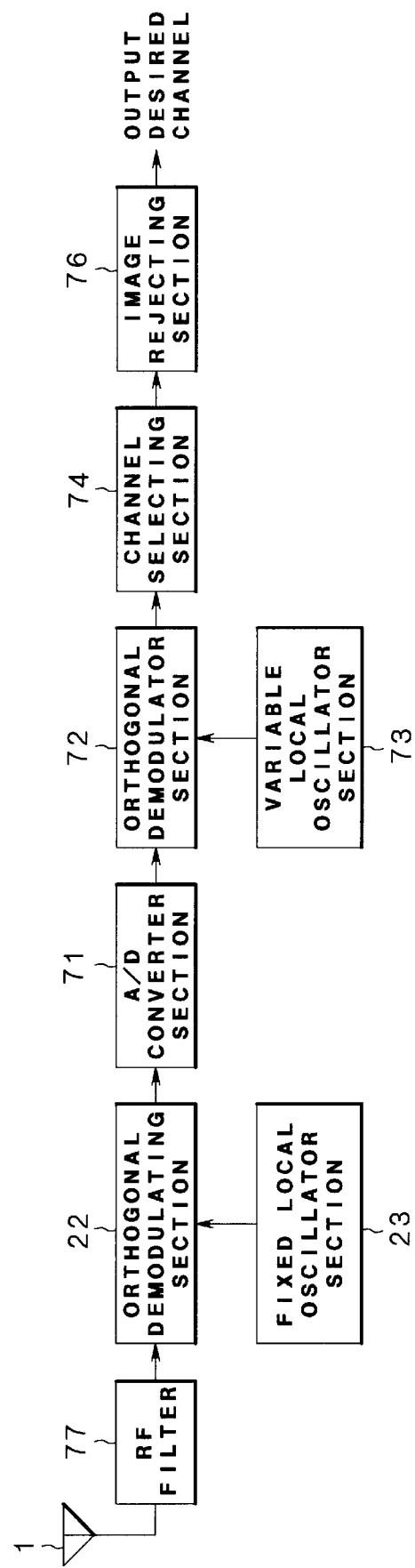
FIG. 10 is a block diagram showing one embodiment of the inventive receiver.

What is different in the receivers in FIGS. 7 through 10 is only the position where the image rejecting section 75 is provided. An image rejecting section 76 carries out the similar operation with that of the image rejecting section 75 by means of digital processing. That is, the receiver in FIG. 8 is what the image rejecting section 76 is provided between the A/D converter section 71 and the orthogonal demodulating section 72, the receiver in FIG. 9 is what the image rejecting section 76 is provided between the orthogonal demodulating section 72 and the channel selecting section 74 and the receiver in FIG. 10 is what the image rejecting section 76 is provided behind the channel selecting section 74. Although the image rejecting sections 75 and 76 follow the orthogonal demodulating process, it may be provided at any position after the orthogonal demodulating section 22 depending on how the circuit is constructed.

That is, the output of the orthogonal demodulating section 22 is supplied to the image rejecting section 75 in FIG. 7. The image rejecting section 75 is a process following the orthogonal demodulating process of the orthogonal demodulating section 22 and outputs the output of the orthogonal demodulating section 22 to the A/D converter section 71 by rejecting the image component thereof. The A/D converter section 71 converts the output of the image rejecting section 75 into a digital signal and outputs it to the orthogonal demodulating section 72.

The output of the orthogonal demodulating section 22 is supplied to the A/D converter section 71 to convert into the digital signal in FIGS. 8 through 10. In FIG. 8, the output of the A/D converter section 71 is supplied to the image rejecting section 76. The image rejecting section 76 rejects the image component by digital processing. For instance, the process of the image rejecting section 76 is carried out as a process following the orthogonal demodulating process of the orthogonal demodulating section 22. The output of the image rejecting section 76 is supplied to the orthogonal demodulating section 72.

In FIGS. 9 and 10, the output of the A/ID converter section 71 is supplied to the orthogonal demodulating section 72. In FIG. 9, the output of the orthogonal demodulating section 72 is supplied to the image rejecting section 76. The process of the image rejecting section 76 is a process following the orthogonal demodulating process of the orthogonal demodulating section 72 and the image rejecting section 76 rejects the image component of the output of the orthogonal demodulating section 72 by means of digital processing and outputs it to the channel selecting section 74.

In FIG. 10, the output of the orthogonal demodulating section 72 is supplied to the image rejecting section 76 via the channel selecting section 74. For instance, the process of the image rejecting section 76 is carried out as a process following the orthogonal demodulating process of the orthogonal demodulating section 72.

Figure 11A:
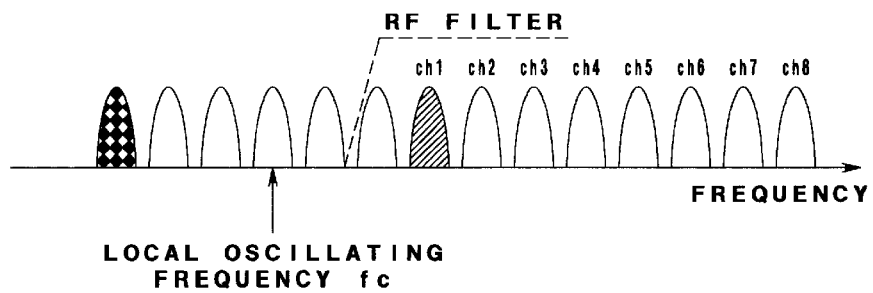
FIGS. 11A through 11D are spectrum diagrams for explaining the operation of the embodiment.
Figure 11B:
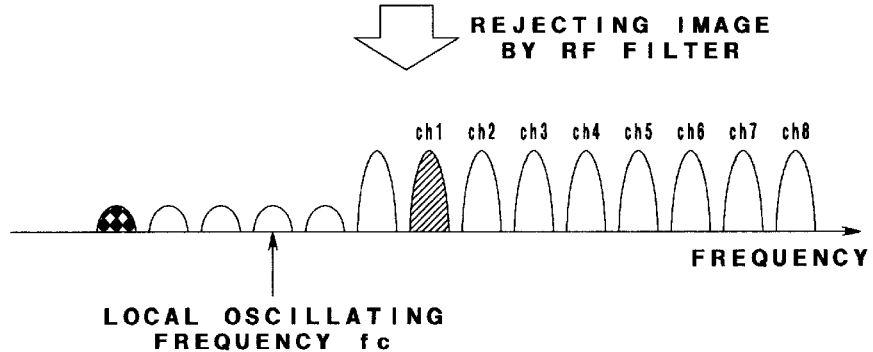
Figure 11C:
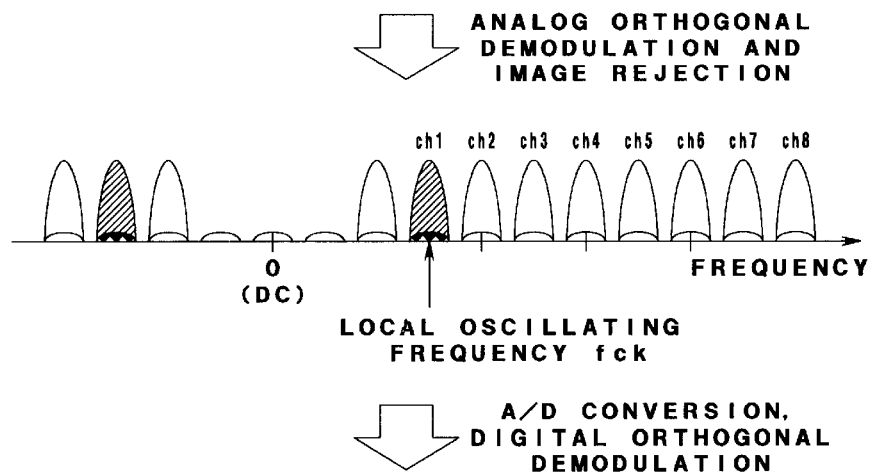
Figure 11D:
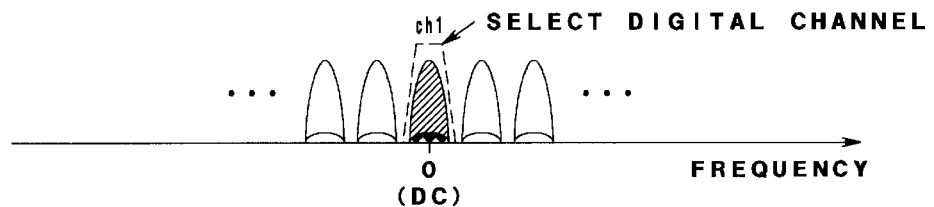

Next, the operation of the embodiment constructed as described above will be explained with reference to the spectrum diagrams of FIGS. 11A through 1D. FIG. 11A shows a received signal, FIG. 1B shows an output of the RF filter 77, FIG. 11C shows an output of the image rejecting section 75, and FIG. 11D shows an output of the channel selecting section 74. In FIGS. 11A through 11D, a desirable wave is represented by a hatched wave and the image component is represented by a grid pattern.

Assume now that channels of a radio communication system to be received are channels 1 (ch1) through 8 (ch8) shown in FIG. 11A. Assume also that the desired signal is ch1 and is selected and received among ch1 through ch8.

According to the present embodiment, the frequency of the fixed local oscillating section 23 is set out of a range of bands of the whole channels of the system to be received at least as shown in FIG. 11A. Then, the RF filter 77 which is an image rejecting filter rejects a band containing the image component of at least the desired signal among channels of other systems not required to receive.

In case of FIG. 11A, the desirable wave is ch1 and the band characteristics of the RF filter 77 is set so as to be able to reject the image signal (grid pattern) corresponding to ch1. The RF signal received by the antenna 1 is rejected into the image signal by the RF filter 77 and is supplied to the orthogonal demodulating section 22.

In principle, the RF filter 77 may be composed of a band-pass filter. Further, it may be composed of a high pass filter in case of lower local as shown in FIG. 11A. Or, in contrary to that, it may be composed of a low-pass filter in case of upper local. In case of the lower local as shown in FIG. 11A, the image signal corresponding to ch1 approaches most in frequency to channel 1 of the system to be received, so that the band of the RF filter 77 is set so as to be able to reject this image signal. FIG. 11B shows the output of the RF filter 77 after carrying out the image rejection. As shown by the grid pattern in FIG. 11B, the image signal component is rejected. Image rejection of around 30 to 40 dB is obtained by the normal RF filter 77.

The orthogonal demodulating section 22 orthogonally demodulates the output of the RF filter 77 by using the local oscillating output from the fixed local oscillating section 23. The orthogonally demodulated signal is supplied to the image rejecting section 75 to reject the image thereof. FIG. 11C shows the output of the image rejecting section 75. The frequency of the whole system including all channels ch1 through ch8 is converted into the low range by the orthogonal demodulation using the local oscillating frequency fC. Then, the image component (grid pattern) is fully rejected by the image rejecting section 75. The image rejecting degree of the image rejecting section 75 following the orthogonal demodulation is 30 to 40 dB. Therefore, the image rejecting degree obtained by the RF filter 77 and the image rejecting section 75 turns out to be 70 dB or more which is practically sufficient image response characteristics.

The output of the image rejecting section 75 is supplied to the A/D converter section 71 to A/D convert all of the channels in FIG. 11C in batch. The output of the A/D converter section 71 is supplied to the orthogonal demodulating section 72. The orthogonal demodulating section 72 orthogonally demodulates the desirable channel (ch1 in case of FIGS. 11A through 11D) by using the local oscillating output from the variable local oscillating section 73. Thereby, ch1 is demodulated as shown in FIG. 11D. The channel selecting section 74 selects and outputs the desirable channel ch1 from the orthogonally demodulated output.

Thus, according to the present embodiment, the wideband receiver which allows the demodulation and selection of the desirable channel by means of digital processing and which excels in the general purposefulness may be realized by receiving and A/D converting the receive signals across the whole system bands (ch1 through ch8) in batch. It also allows the RF filter 77 which rejects the image component to be provided by setting the oscillating frequency of the fixed local oscillating section 23 on the outside of the system bands to obtain the sufficient image rejecting degree by the image rejecting section 75 and the RF filter 77 which are provided after the orthogonal demodulating section 22. Thereby, the good image rejecting characteristics may be obtained. It is also possible to accommodate with a plurality of systems having different band widths readily because the band width of the digital filter of the channel selecting section 74 and the cutoff frequency may be controlled and changed flexibly by controlling from the outside.

FIGS. 37A through 37D are spectrum diagrams corresponding to FIGS. 11A through 11D, respectively, and explaining the operation of the embodiment in FIG. 8. FIGS. 38A through 38D are spectrum diagrams corresponding to FIGS. 11A through 11D, respectively, and explaining the operation of the embodiment in FIG. 9. FIGS. 39A through 39D are spectrum diagrams corresponding to FIGS. 11A through 11D, respectively, and explaining the operation of the embodiment in FIG. 10. FIGS. 37A through 37D, FIGS. 38A through 38D and FIGS. 39A through 39D are different from FIGS. 11A through 11D only in the timing of image rejection and an explanation thereof will be omitted here.

FIG. 12 is a circuit diagram showing another embodiment of the invention and shows a concrete circuit of the embodiment in FIG. 7.

The output of the antenna 1 is supplied to a band-pass filter 81 composing the RF filter 77. The band-pass filter 81 rejects the image component of the inputted signal and outputs to the orthogonal demodulating section 22. A local oscillator 82 and the phase shifter 6 composing the fixed local oscillating section 23 supply the local oscillating output, i.e., the reference signal, to the mixers 3 and 4. The mixers 3 and 4 orthogonally demodulate the inputted signal by using the local oscillating output to convert the frequency into the low band and supply to the low-pass filters 7 and 8.

The low-pass filters 7 and 8 limit the band of the output of the mixers 3 and 4. The output of the low-pass filter 7 is supplied to a phase shifter 61 and the output of the low-pass filter 8 is supplied to an adder 62. The phase shifter 61 shifts the phase of the output of the low-pass filter 7 by $\pi/2$ and supplies to the adder 62. The low-pass filters 7 and 8, the phase shifter 61 and the adder 62 compose the image rejecting section 75. The adder 62 supplies the output whose image component has been rejected to the A/D converter (A/D) 63 by subtracting the output of the low-pass filter 8 from the output of the phase shifter 61.

The A/D converter 63 converts the signals of all inputted channels into digital signals in batch and then outputs to multipliers 65 and 66 of the digital processing section 64. The multipliers 65 and 66 compose the orthogonal demodulating section 72 to which the local oscillating output is supplied from a local oscillator 67 and a phase shifter 68 which compose the variable local oscillating section 73. The multipliers 65 and 66 demodulate the desirable channel from all of the inputted channels by using the local oscillating output. The local oscillator 67 is set at frequency corresponding to the frequency of the desirable channel.

The outputs of the multipliers 65 and 66 are supplied to low-pass filters 69 and 70, respectively. The low-pass filters 69 and 70 compose the channel selecting section 74 so as to output the signals of I and Q axes by selecting the desirable channel.

In the embodiment constructed as described above, when the signal in FIG. 11A is induced at the antenna 1, the RF signal whose image component has been rejected may be obtained by the band-pass filter 81 as shown in FIG. 11B. The oscillating frequency fC of the local oscillator 82 is set on the outside of the band of all channels. The multipliers 3 and 4 then implements the orthogonal demodulation by using the oscillating output of the local oscillator 82 to convert the frequency of all channels into the low range.

The output of the multiplier 3 is limited by the low-pass filter 7 and is then supplied to the adder 62 via the phase shifter 61. The output of the multiplier 4 is limited by the low-pass filter 8 and is then supplied to the adder 62. The image component is rejected further by the adding process of the adder 62. The analog orthogonally demodulated output shown in FIG. 11C may be obtained from the adder 62.

The output of the adder 62 is converted into a digital signal by the A/D converter 63 and is then supplied to the digital processing section 64. The multipliers 65 and 66 of the digital processing section 64 orthogonally demodulate the inputted signal by using the oscillating output corresponding to the desirable channel from the local oscillator 67. Thus, the orthogonally demodulated output as shown in FIG. 11D may be obtained. The low-pass filters 69 and 70 select only the desirable channel ch1 and output as the I and Q signals.

Thus, the image rejection is carried out by the mixers 3 and 4, the fixed local oscillator 82, the $\pi/2$ phase shifter 6, the low-pass filters 7 and 8, the π/2 phase shifter 61 and the adder 62 in the present embodiment. This structure forms the known image rejection mixer and can realize image rejection of about 30 dB. Accordingly, it is possible to achieve the image rejecting degree of 60 to 70 dB or more by the whole receiver together with the image rejecting degree (30 to 40 dB) of the band-pass filter 81.

Figure 13:
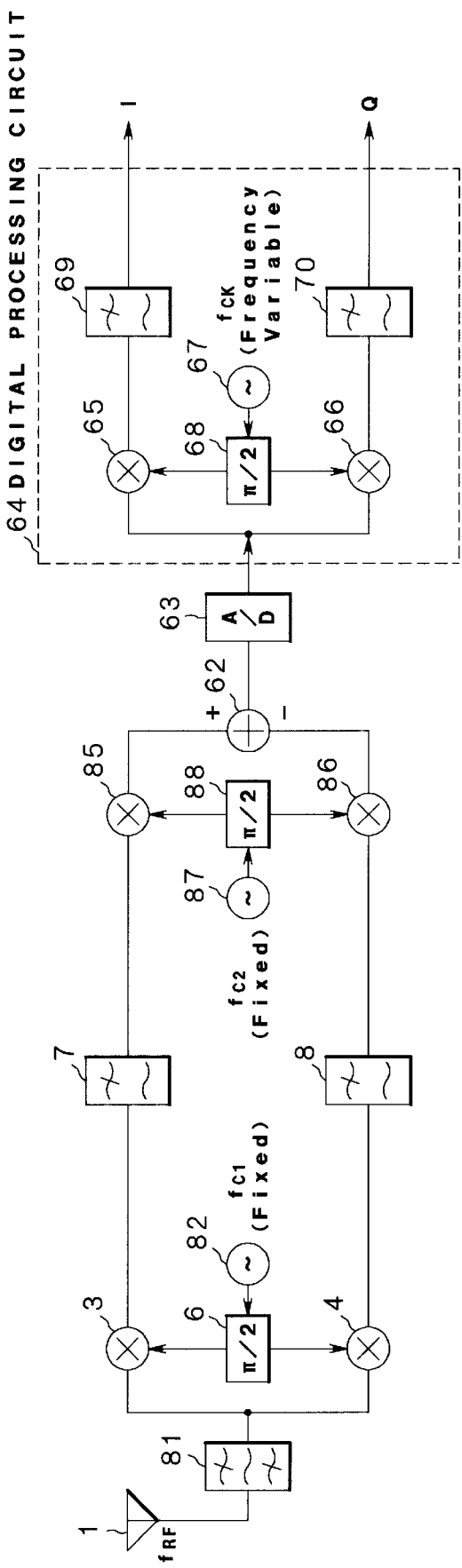
FIG. 13 is a circuit diagram showing another embodiment of the invention.

FIG. 13 is a circuit diagram showing another embodiment of the invention. In FIG. 13, the same structural elements with those in FIG. 12 are denoted by the same reference numerals and an explanation thereof will be omitted here.

The present embodiment is what the function of the π/2 phase shifter 61 in FIG. 12 is realized by using a fixed local oscillator 87, mixers 85 and 86 and a π/2, phase shifter 88. The fixed local oscillator 87 oscillates at predetermined oscillating frequency fC2 and outputs the oscillating output to the phase shifter 88. The phase shifter 88 shifts the oscillating output by π/2 and supplies the oscillating outputs which are inverted from each other to multipliers 85 and 86. The multipliers 85 and 86 multiply the outputs of the low-pass filters 7 and 8 with the oscillating outputs from the phase shifter 88 and output them to the adder 62.

In the embodiment constructed as described above, the outputs of the low-pass filters 7 and 8 are given to the multipliers 85 and 86 and are supplied to the adder 62 in the same phase. Thus, the image component may be rejected also by the adder 62. That is, similarly to the embodiment in FIG. 12, the image rejection mixer may be constructed from the input of the mixers 3 and 4 to the output of the adder 62 also in the embodiment in FIG. 13.

Figure 14:
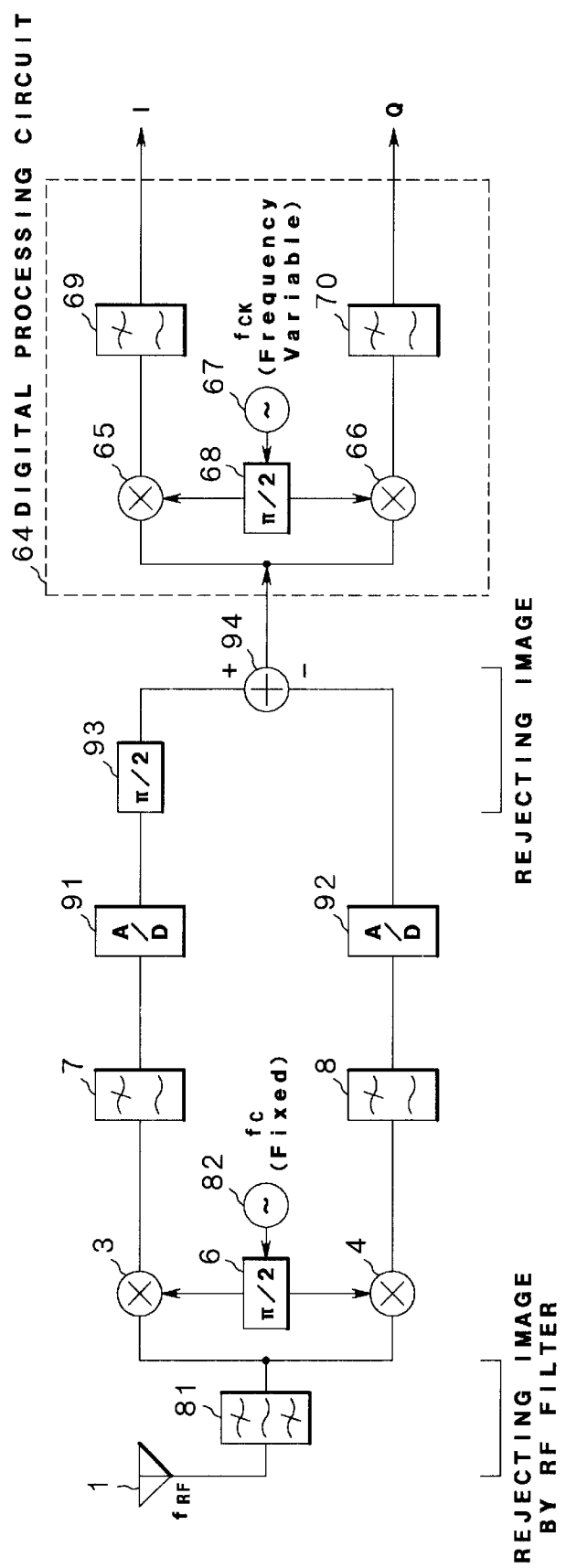
FIG. 14 is a circuit diagram showing another embodiment of the invention.

FIG. 14 is a circuit diagram showing another embodiment of the invention and shows a concrete circuit of the embodiment in FIG. 8. In FIG. 14, the same structural elements with those in FIG. 12 are denoted by the same reference numerals and an explanation thereof will be omitted here.

The present embodiment is different from the embodiment in FIG. 12 in that it adopts A/D converters 91 and 92 instead of the A/D converter 63 and a phase shifter 93 and an adder 94 instead of the phase shifter 61 and the adder 62, respectively. The A/D converters 91 and 92 convert the outputs of the low-pass filters 7 and 8 into digital signals and output them to the phase shifter 93 or the adder 94, respectively. The phase shifter 93 outputs the output of the A/D converter 91 to the adder 94 after shifting the phase by π/2 by digital processing. The adder 94 subtracts the output of the A/D converter 92 from the output of the phase shifter 93 and outputs the result of subtraction to the digital processing section 64. That is, the present embodiment is what the phase shifter 93 which corresponds to the π/2 phase shifter 61 in FIG. 12 and thereafter is constructed in digital. The phase shifter 93 and the adder 94 reject the image component.

The operation of the embodiment constructed as described above is different from that of the embodiment in FIG. 12 in that the image component is rejected after converting the output of the low-pass filters 7 and 8 into digital.

Although the present embodiment is similar to the embodiment in FIG. 12 functionally, the π/2 phase shifter whose band is wider than the analog π/2 phase shifter 61 may be readily constructed because the phase shifter 93 is structured in digital. However, it consumes more power because it requires two A/D converters 91 and 92. It is noted that it is apparent that the same effect may be obtained by providing an analog π/2 phase shifter before the A/D converters 91 and 92 instead of the π/2 phase shifter 93 in the arrangement in FIG. 14.

Figure 15:
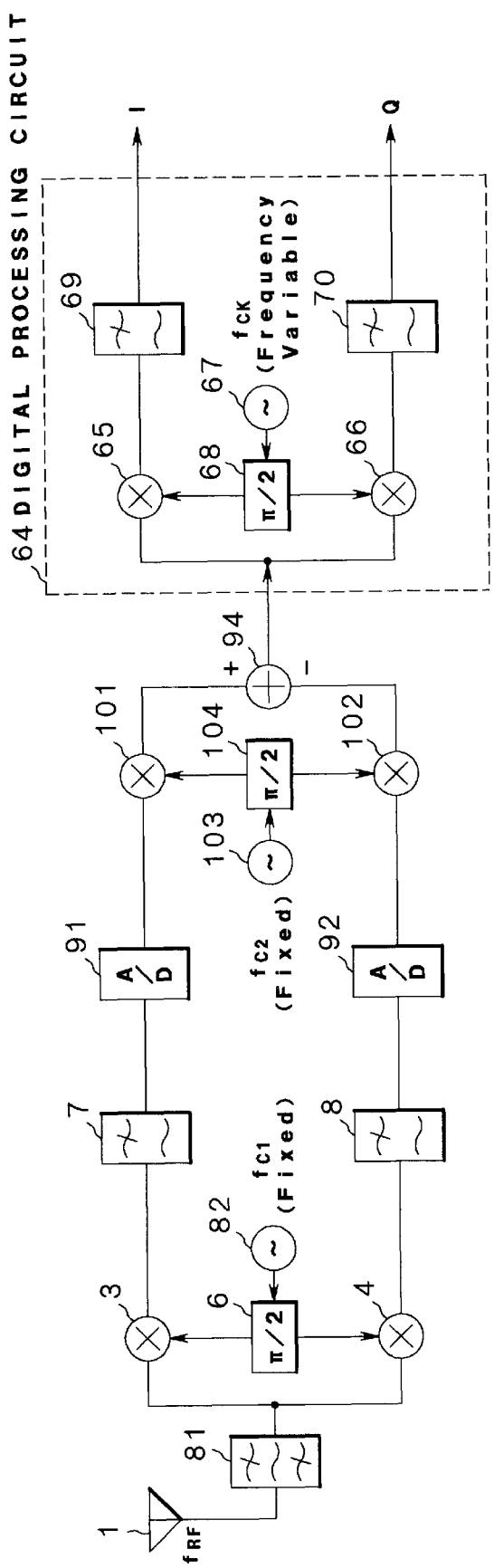
FIG. 15 is a circuit diagram showing another embodiment of the invention.

FIG. 15 is a circuit diagram showing another embodiment of the invention. In FIG. 15, the same structural elements with those in FIG. 14 are denoted by the same reference numerals and an explanation thereof will be omitted here.

The present embodiment is what the function of the π/2 phase shifter 93 in FIG. 14 is realized by using a fixed local oscillator 103, mixers 101 and 102 and a π/2 phase shifter 104 structured in digital. The fixed local oscillator 103 oscillates at predetermined oscillating frequency fC2 and outputs the oscillating output to the phase shifter 104. The phase shifter 104 shifts the oscillating output by π/2 and supplies the oscillating outputs which are inverted from each other to multipliers 101 and 102. The multipliers 101 and 102 multiply the outputs of the A/D converters 91 and 92 with the oscillating outputs from the phase shifter 104 and output them to the adder 94.

In the embodiment constructed as described above, the outputs of the A/D converters 91 and 92 are given to the multipliers 101 and 102 and are supplied to the adder 94 in the same phase. Thus, the image component may be rejected also by the adder 94. That is, the image rejection is realized by the fixed local oscillator 103, the mixers 101 and 102, the π/2 phase shifter 104 and the adder 94 in the embodiment in FIG. 15.

Thus, the same effect with that of the embodiment in FIG. 14 may be obtained by the present embodiment.

Figure 16:
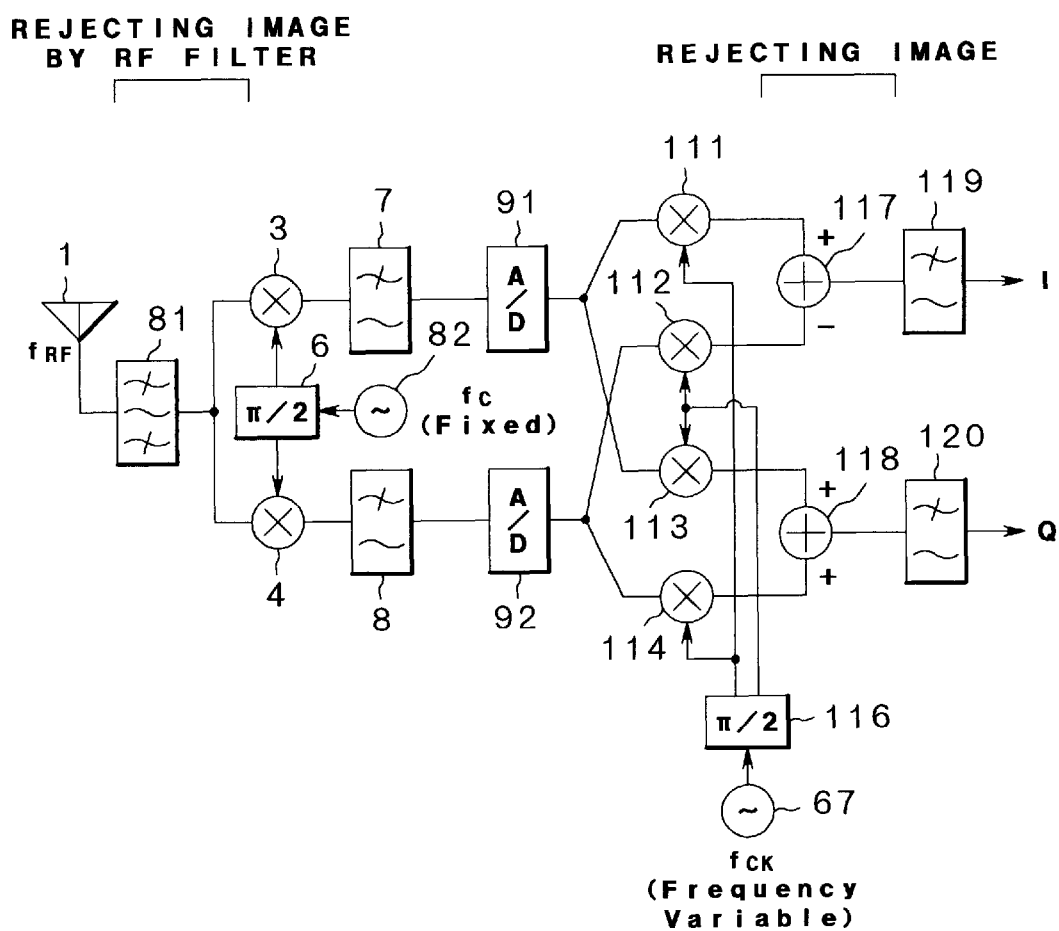
FIG. 16 is a circuit diagram showing another embodiment of the invention.

FIG. 16 is a circuit diagram showing another embodiment of the invention and shows a concrete circuit of the embodiment in FIG. 9. In FIG. 16, the same structural elements with those in FIG. 14 are denoted by the same reference numerals and an explanation thereof will be omitted here.

In the present embodiment, the output of the A/D converter 91 is supplied to multipliers 111 and 113 and the output of the A/D converter 92 is supplied to multipliers 112 and 114. A phase shifter 116 shifts the phase of the oscillating output of the local oscillator 67 by π/2 and supplies the oscillating outputs which are inverted from each other to the multipliers 111 and 114 and the multipliers 112 and 113. The multipliers 111 through 114 implement the orthogonal demodulation by multiplying the inputted signal with the oscillating output from the phase shifter 116.

The outputs of the multipliers 111 and 112 are given to an adder 117 and the outputs of the multipliers 113 and 114 are given to an adder 118. The adder 117 rejects an image component by subtracting the outputs of the multipliers 111 and 112 and outputs the result to a low-pass filter 119. The adder 118 rejects an image component by subtracting the outputs of the multipliers 113 and 114 and outputs the result to a low-pass filter 120. The low-pass filters 119 and 120 select only a desirable channel from the inputted signals and output as I and Q signals.

In the embodiment constructed as described above, the image rejection is carried out by the adders 117 and 118. That is, an image rejection mixer is constructed by the sections from the input of the mixers 3 and 4 to the digital adders 117 and 118. When the signal shown in FIG. 11A is received by the antenna 1 and ch1 is to be selected and demodulated, the output of the band-pass filter 81 turns out as shown in FIG. 11B.

Then, the demodulated output of the desirable channel ch1 whose image has been rejected as shown in FIG. 11D may be obtained from the outputs of the adders 117 and 118. The low-pass filters 119 and 120 select the desirable channel ch1 and output as I and Q signals.

The same effect with the respective embodiments described above may be obtained also by the embodiment arranged as described above.

Figure 1A:
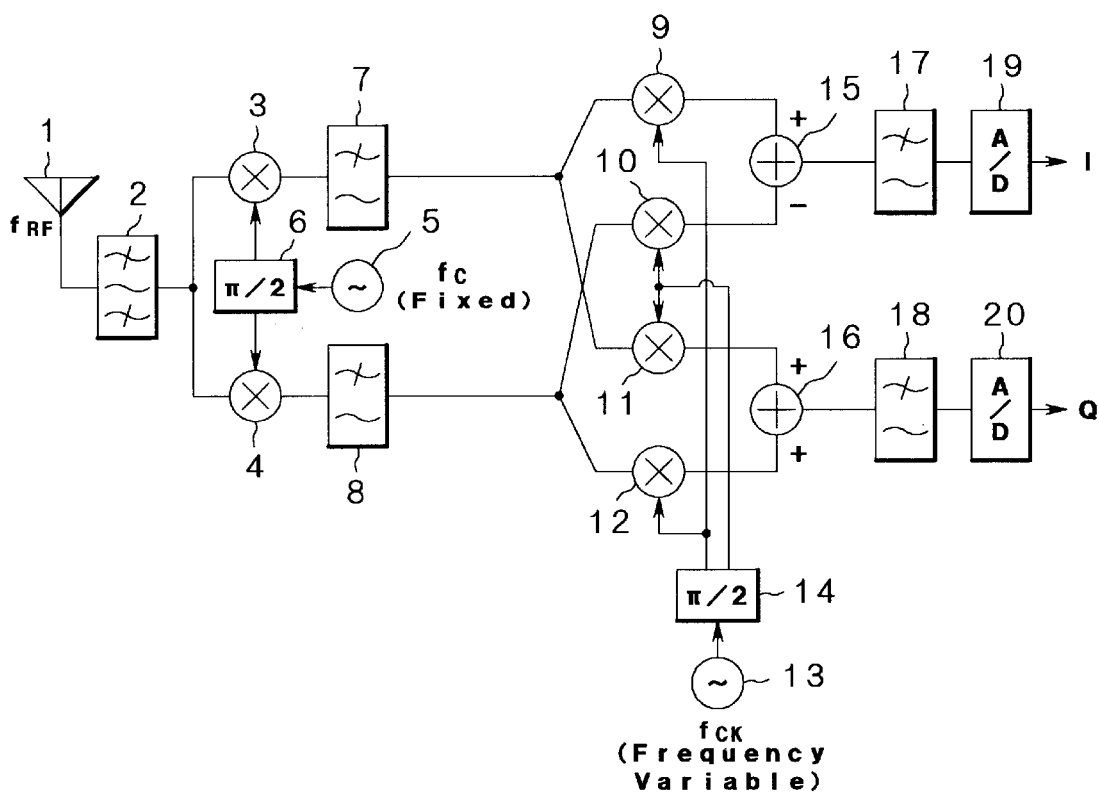
FIGS. 1A and 1B are diagrams for explaining a related art of a receiver.
Figure 1B:
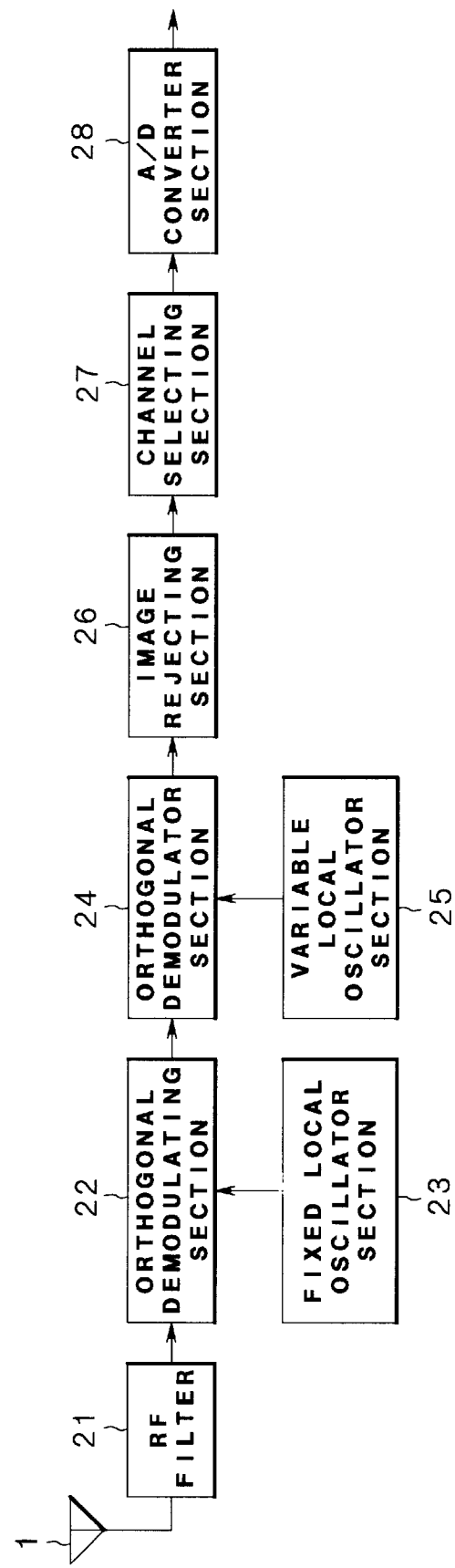

That is, the receiver in the embodiment of FIG. 16 is capable of obtaining a high image rejecting degree because it carries out the orthogonal demodulating process for selecting the channel by the digital processing with respect to the receiver in FIG. 1A shown as the related art. The low-pass filters 119 and 120 for selecting the desirable channel are also constructed in digital and can deal with changes and the like of the band and the cutoff characteristics readily.

Figure 2A:
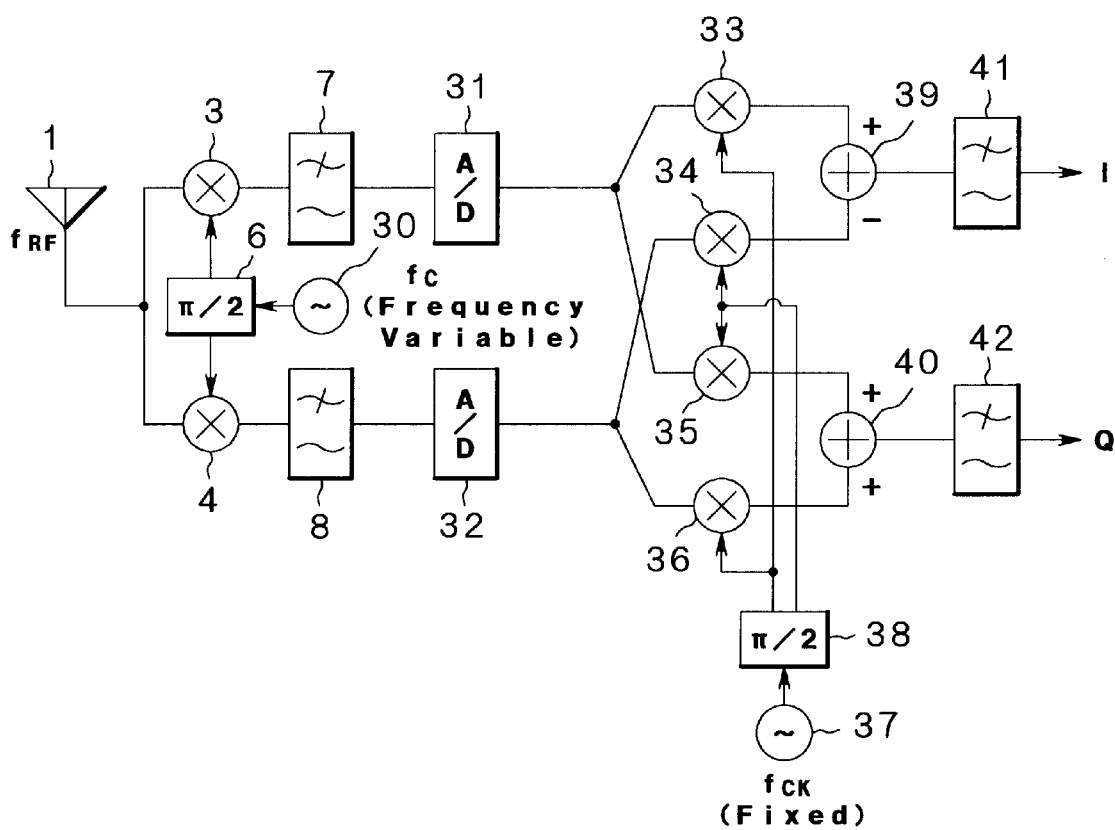
FIGS. 2A and 2B are diagrams for explaining a related art of a receiver.
Figure 2B:
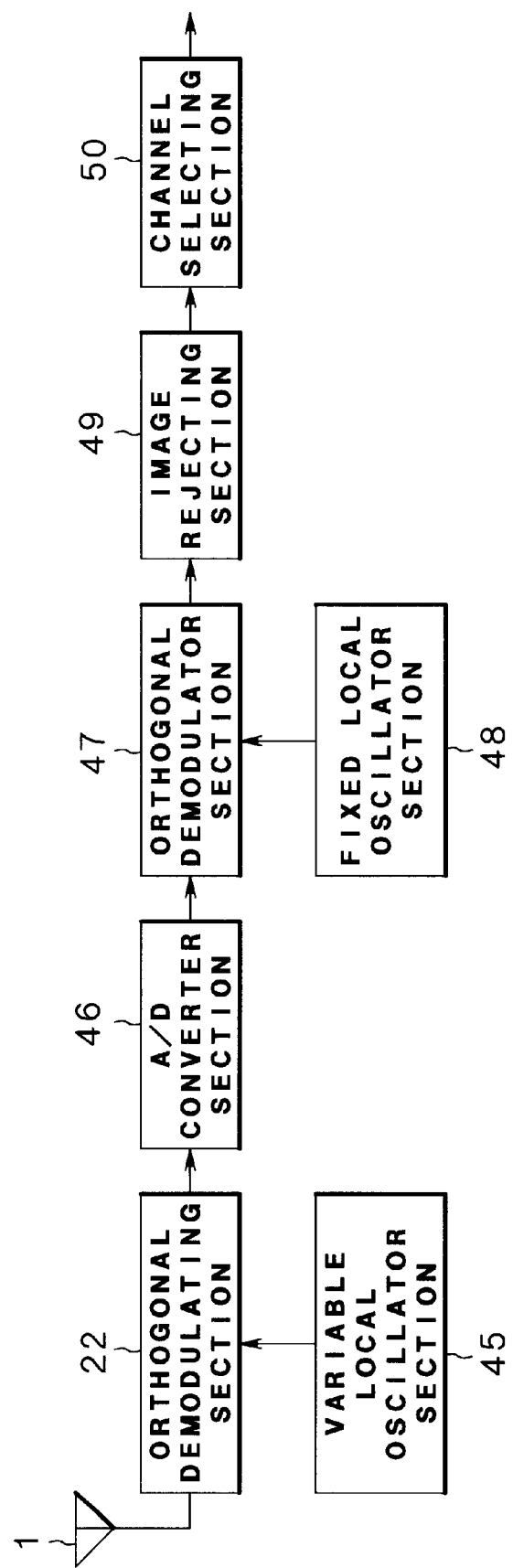

The receiver in the embodiment in FIG. 16 is also capable of obtaining a full image rejecting degree because it is provided with the band-pass filter 81 which functions as the RF filter 77 with respect to the receiver in FIG. 2A shown as the related art. It is also capable of obtaining the high precision oscillating output across the wide band because the variable local oscillator 67 for selecting the desirable channel is constructed in digital. The frequency may be also changed programmably because it is constructed in digital.

Figure 3A:
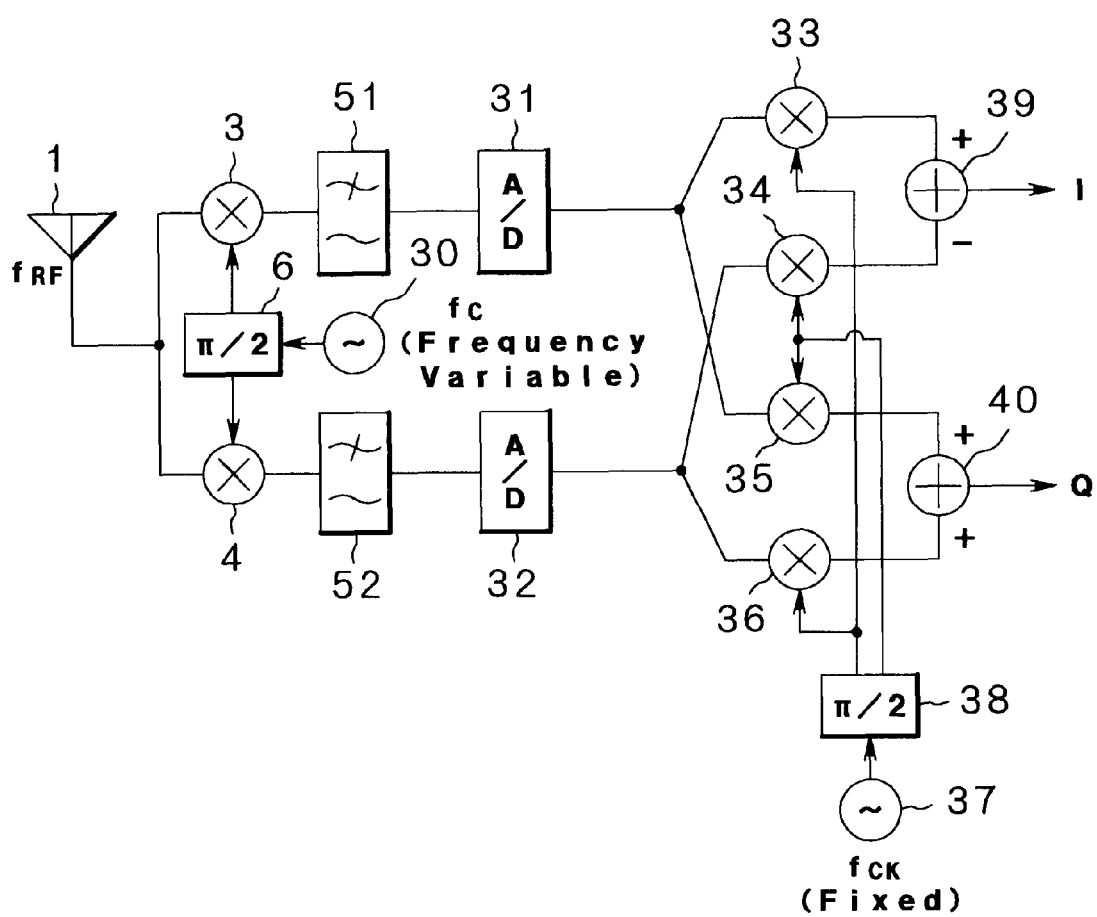
FIGS. 3A and 3B are diagrams for explaining a related art of a receiver.
Figure 3B:
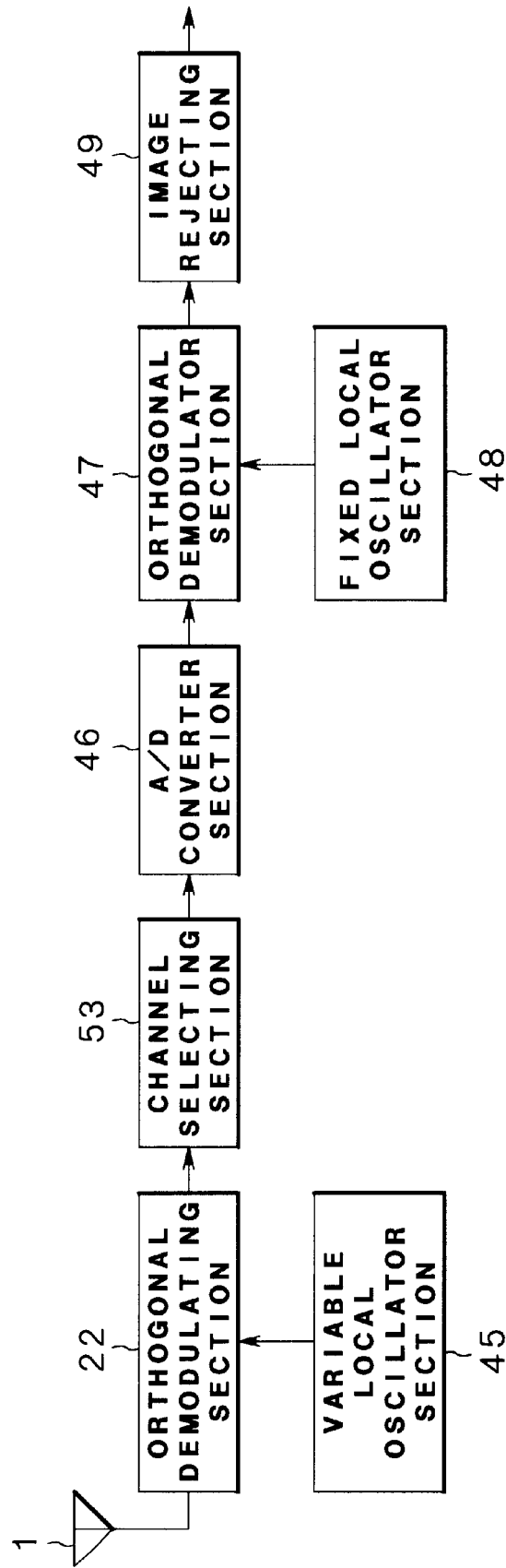
Figure 4:
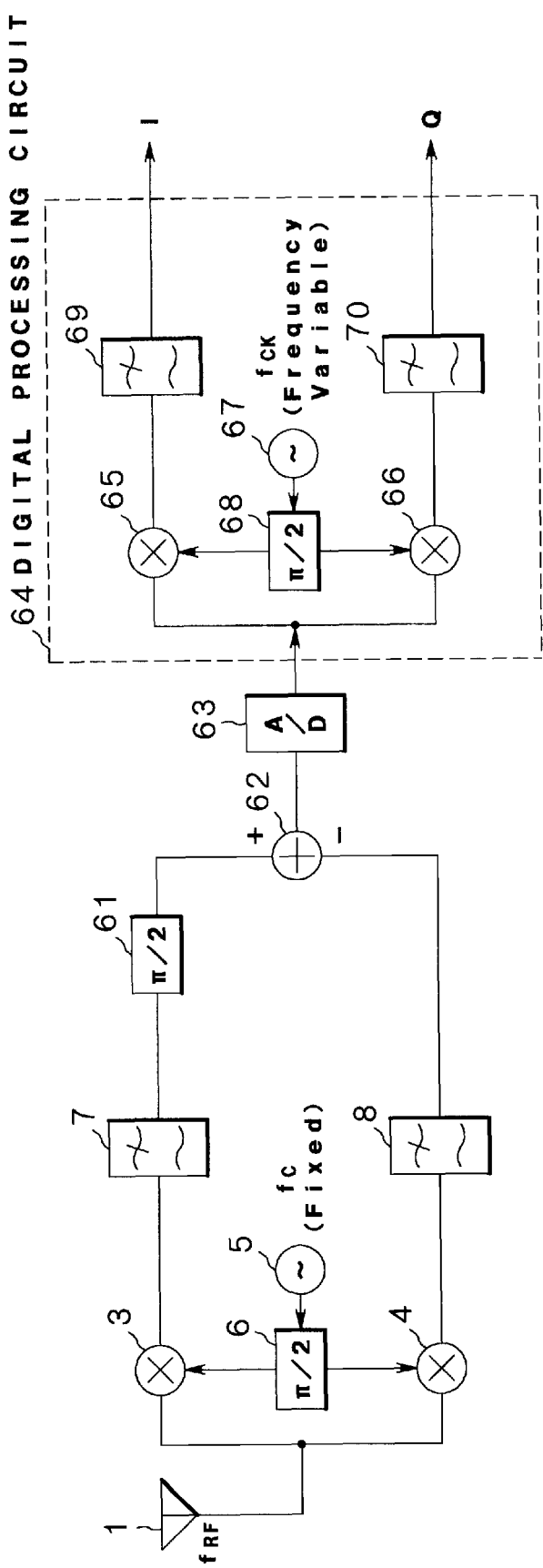
FIG. 4 is a diagram for explaining the related art of a receiver.
Figure 5A:
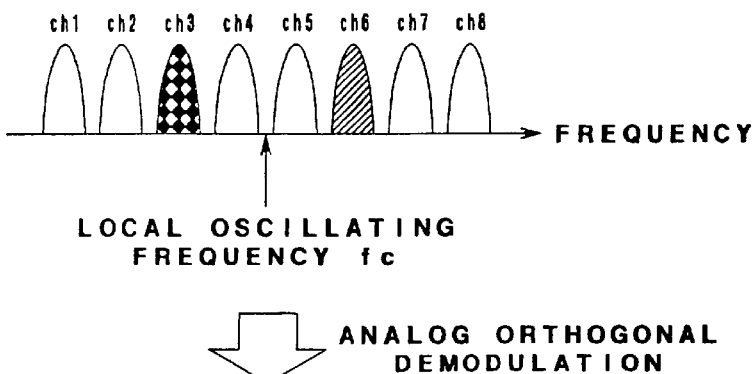
FIGS. 5A through 5C are spectrum diagrams for explaining an exemplary related art.
Figure 5B:
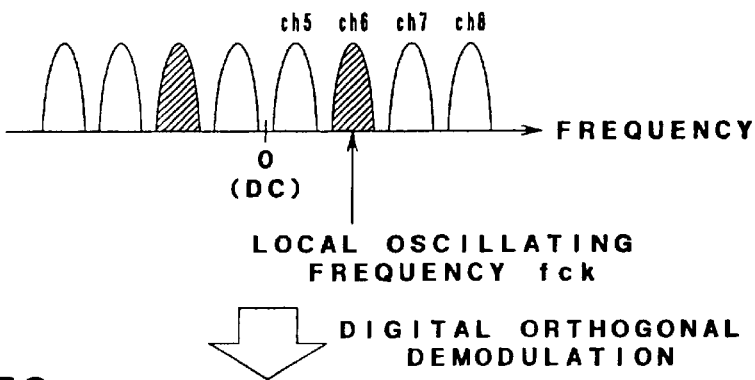
Figure 5C:
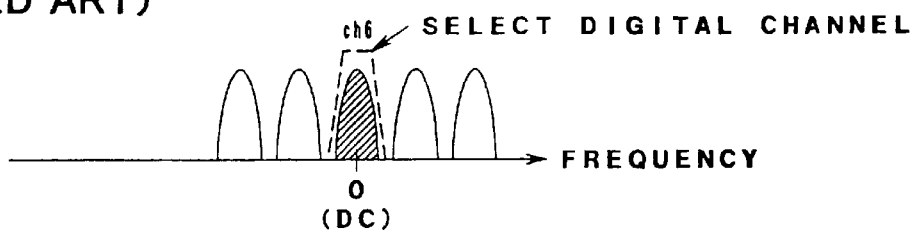
Figure 6A:
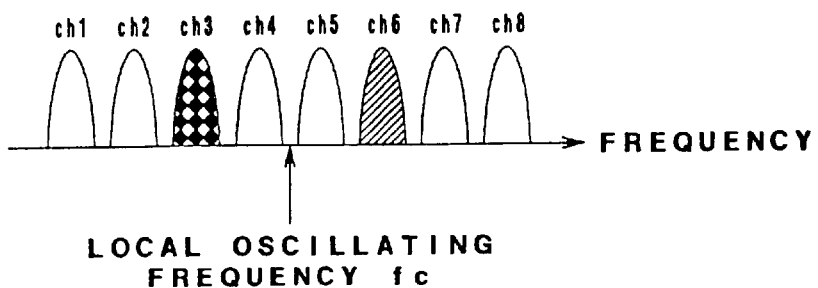
FIGS. 6A through 6C are spectrum diagrams for explaining problematic points of the exemplary related art.
Figure 6B:
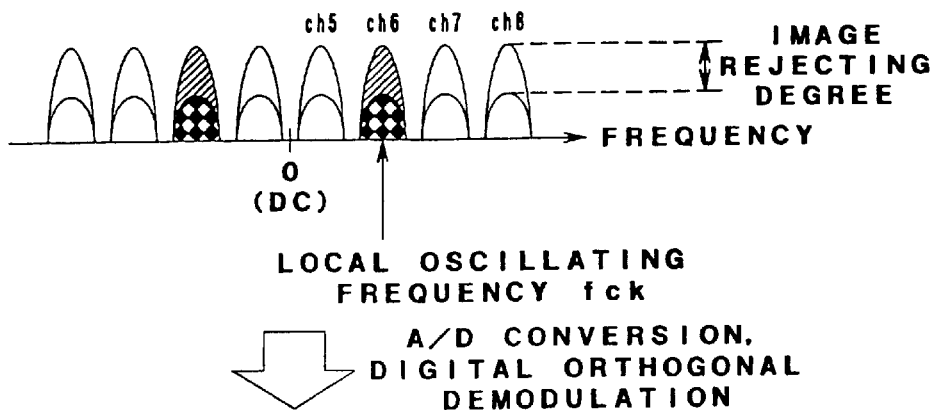
Figure 6C:
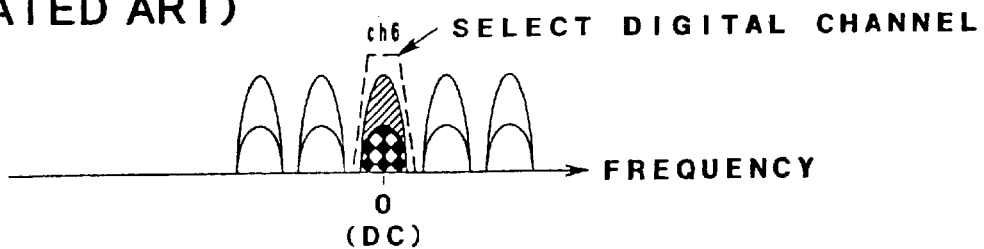

The receiver in the embodiment in FIG. 16 is also capable of obtaining the full image rejecting degree because it is provided with the band-pass filter 81 which functions as the RF filter 77 with respect to the receiver in FIG. 3A shown as the related art. Further, although the characteristics of the filter 51 after the mixers 3 and 4 must be changed in analog corresponding to a channel to be selected in the arrangement in FIG. 3A, the filters 7 and 8 in the present embodiment can correspond to the changes of a channel to be selected flexibly because they are for the anti-aliasing and the filters for selecting the channel is constructed by the digital filters 119 and 120.

Figure 17:
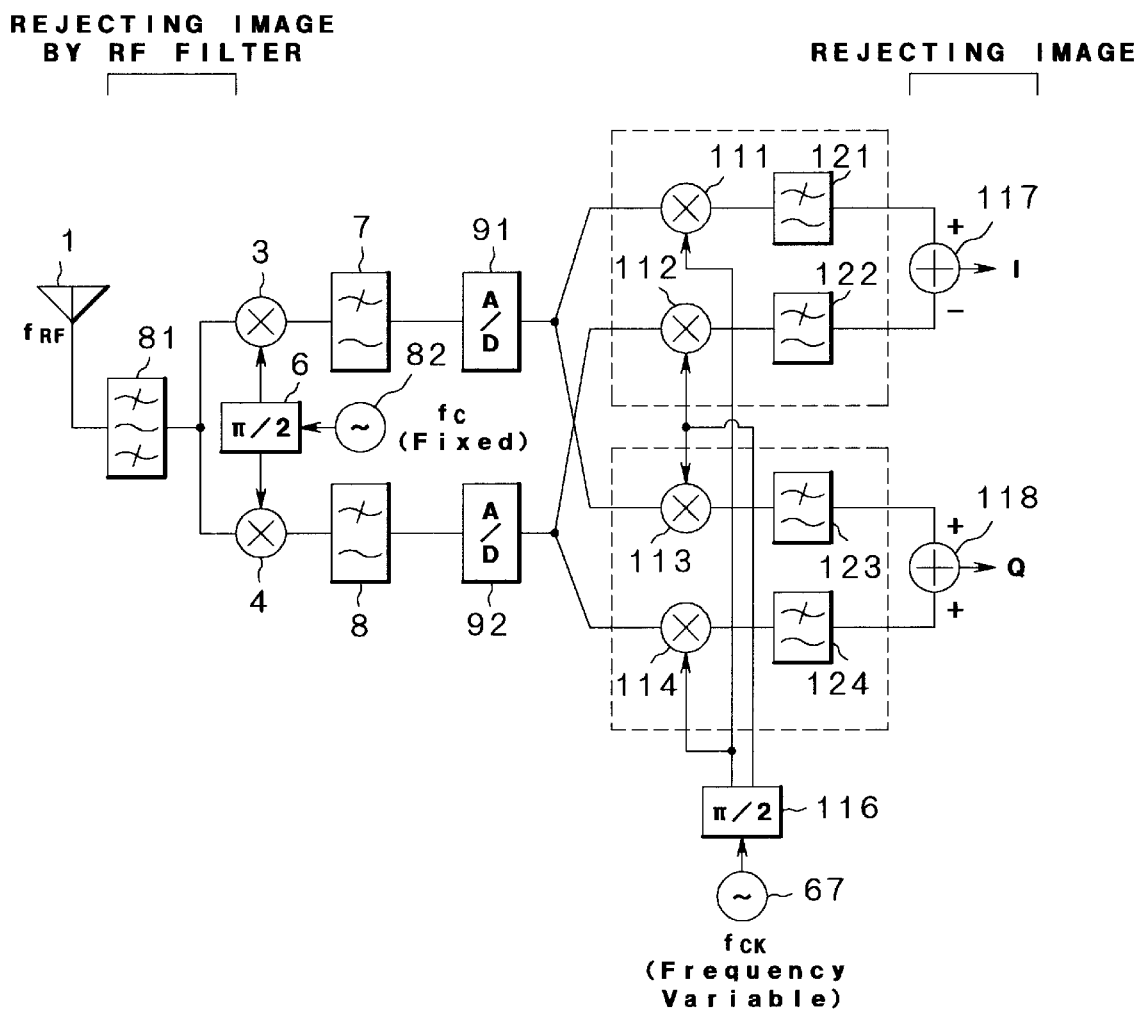
FIG. 17 is a circuit diagram showing another embodiment of the invention.

FIG. 17 is a circuit diagram showing another embodiment of the invention and shows a concrete circuit of the embodiment in FIG. 10. In FIG. 17, the same structural elements with those in FIG. 16 are denoted by the same reference numerals and an explanation thereof will be omitted here.

The present embodiment is different from the embodiment in FIG. 16 in that it adopts low-pass filters 121 and 122 instead of the low-pass filter 119 and low-pass filters 123 and 124 instead of the low-pass filter 120. The low-pass filters 121 and 122 select the component of a desirable channel from the outputs of the multipliers 111 and 112, respectively, and output it to an adder 117. The low-pass filters 123 and 124 select the component of a desirable channel from the outputs of the multipliers 113 and 114, respectively, and output it to an adder 118. That is, the image suppressing section is provided at the last stage in the present embodiment.

The similar operation with that of the embodiment in FIG. 16 is carried out also in the present embodiment constructed as described above. Although an amount of arithmetic operations in the filtering section increases as compared to the embodiment in FIG. 16, the present embodiment is advantageous in that ready-made articles such as "HSP50027" of Haris Co. may be utilized in two digital processing sections surrounded by broken lines.

Thus, the present embodiment is advantageous in that the same effect with the embodiment in FIG. 16 may be obtained and that the wide-band receiver may be constructed readily by utilizing the existing digital processing sections.

Figure 18:
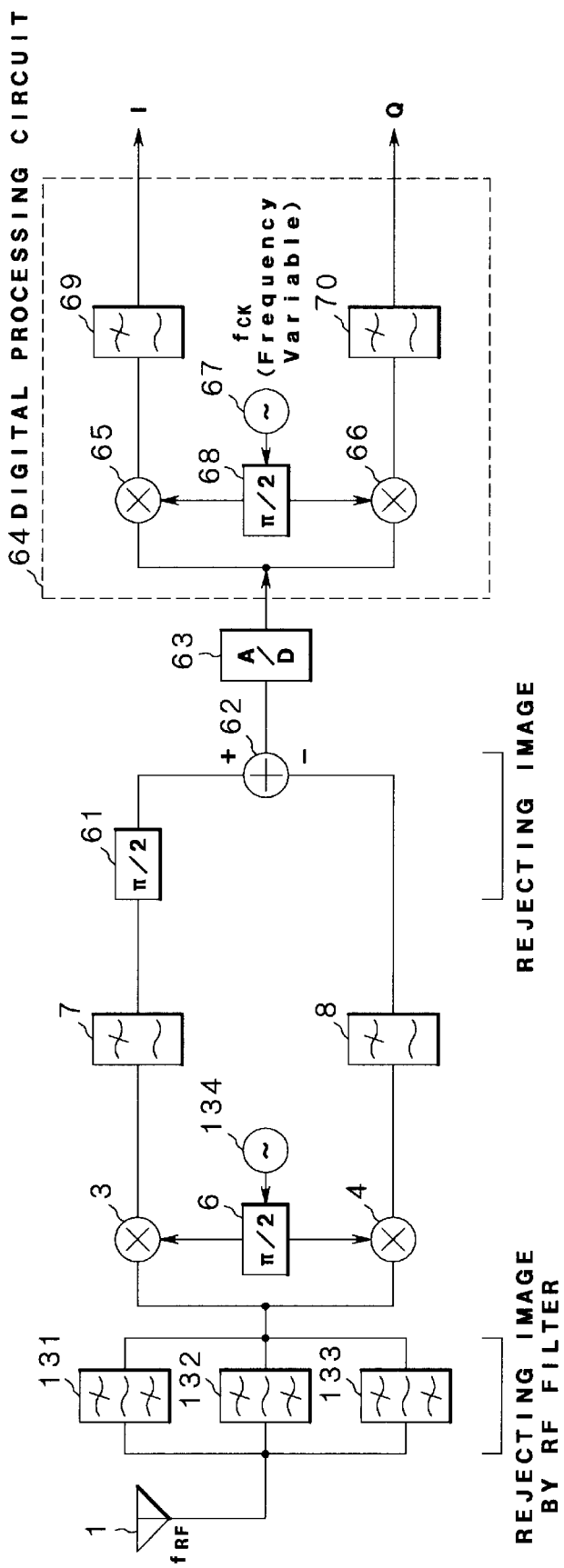
FIG. 18 is a circuit diagram showing another embodiment of the invention.

FIG. 18 is a circuit diagram showing another embodiment of the invention. In FIG. 18, the same structural elements with those in FIG. 12 are denoted by the same reference numerals and an explanation thereof will be omitted here. The present embodiment is a case of allowing a plurality of systems each having a plurality of channels to be received.

Figure 19:
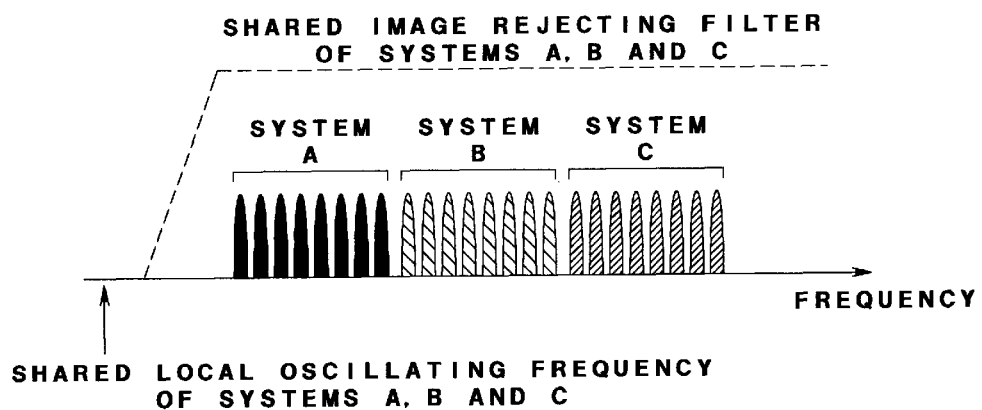
FIG. 19 is a spectrum diagram for explaining the embodiment of FIG. 18.

Assume now that the signal received by the antenna 1 is a signal containing systems A, B and C each having a plurality of channels. In the receiver of the embodiment in FIG. 12, the oscillating frequency of the local oscillator 82 is set on the outside of the range of the whole band of all channels of the systems A, B and C as shown in FIG. 19. In this case, the optimum frequency characteristic for rejecting the image is different per each signal of the systems A, B and C for the band-pass filter 81. That is, the frequency of the low-pass filters 7 and 8 increases in the order of the systems A, B and C and it is considered to be difficult to realize from the points of view of power consumption and band width of the low-pass filters 7 and 8.

Then, the present embodiment is arranged so as to change the oscillating frequency of the local oscillator per system. That is, the present embodiment is different from the embodiment in FIG. 12 in that it is provided with band-pass filters 131 through 133 instead of the band-pass filter 81 and adopts a local oscillator 134 instead of the local oscillator 82. The band-pass filters 131 through 133 are band-pass filters which are set at frequency bands different from each other. The local oscillator 134 oscillates at oscillating frequency corresponding to the respective systems A, B and C. It is noted that each oscillating frequency is set on the outside of the band of each system, respectively.

Figure 20:
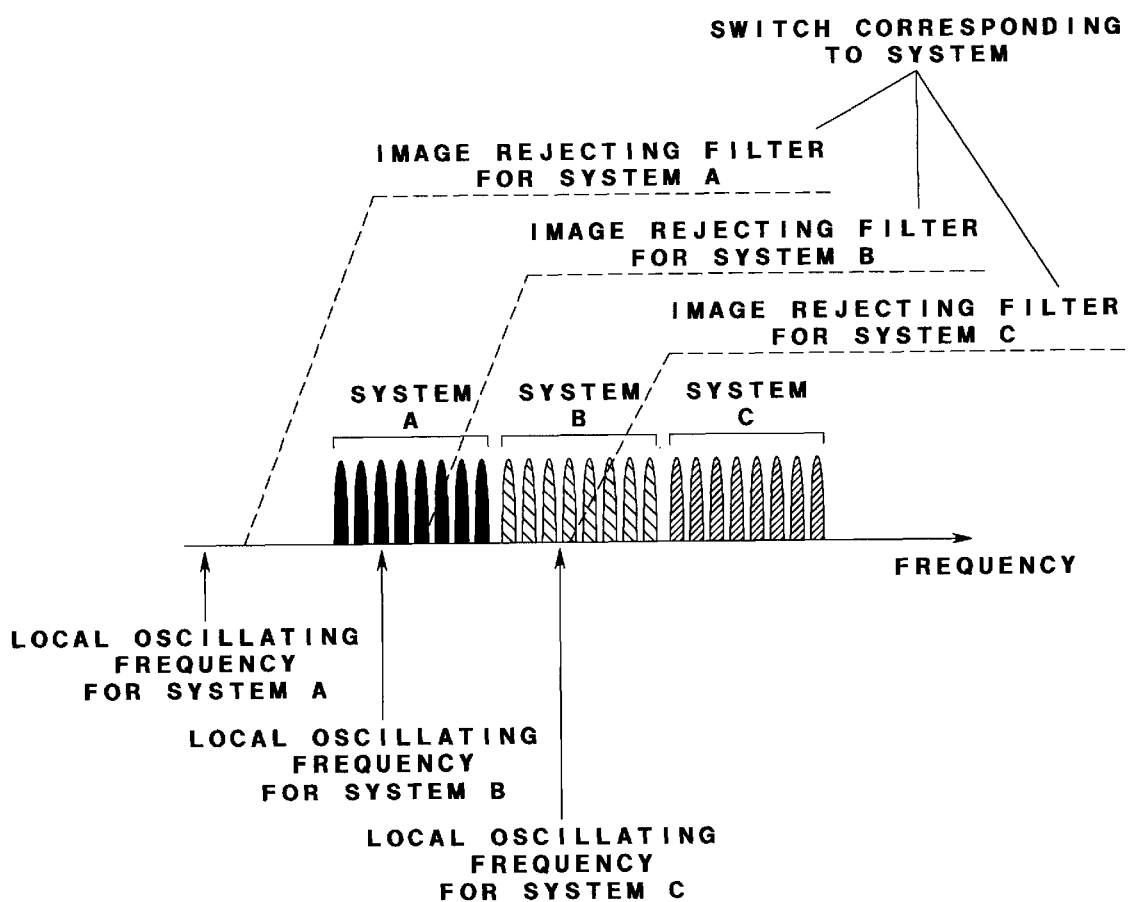
FIG. 20 is a spectrum diagram for explaining the embodiment of FIG. 18.

Next, the operation of the embodiment constructed as described above will be explained with reference to FIG. 20. FIG. 20 is a spectrum diagram for explaining the operation in applying to the plurality of systems. In FIG. 20, the systems A, B and C are systems having different frequency bands.

The signal received by the antenna 1 is supplied to the band-pass filters 131 through 133. The band-pass filters 131 through 133 reject the image component corresponding to the band of the respective systems A, B and C and output it to the multipliers 3 and 4. That is, the band-pass filter 131 rejects the image component in receiving the system A. In the same manner, it rejects the image component by the band-pass filters 132 and 133, respectively, in receiving the systems B and C.

The oscillating frequency of the local oscillator 134 is changed per each system A, B and C. Each system is orthogonally demodulated in batch per system band. The other operation is the same with that of the embodiment in FIG. 12.

That is, the channels are switched within each system not by the local oscillator 134 but by the digital processing of the variable local oscillator 67 to the end. Further, the channel is selected not by the analog filter but by the low-pass filters 69 and 70 in digital.

Thus, the present embodiment allows the filtering characteristics to be readily achieved also in receiving the plurality of systems in the different bands having the plurality of channels, respectively.

It is noted that although the RF filter and the analog local oscillator have been changed corresponding to the structure of FIG. 12 in the embodiment of FIG. 18, it is apparent that the similar change may be made in applying to the embodiments in FIGS. 13 through 17.

FIGS. 21 through 24 are block diagram showing another embodiment of the invention. In FIGS. 21 through 24, the same structural elements with those in FIGS. 7 through 10 are denoted by the same reference numerals and an explanation thereof will be omitted here.

By the way, it is presupposed that the A/D converter section 71 A/D converts the whole system bands of ch1 through ch8 in the arrangements shown in FIGS. 7 through 10. The system band of radio communication is 20 MHz or more in general and a very broad-band A/D converter is required in order to receive the whole bands of ch1 through ch8. Although such A/D converter has come to be realized technologically with the late advancement of devices and there is no specific problem in applying it to base stations, it is difficult to apply it to terminals and is difficult to put into practical use soon from the aspects of power consumption and heat radiation in particular.

Then, the present embodiment has been arranged so as to assure the lowest possible general purposefulness by programmably selecting a channel by reducing the burden of the A/D converter by receiving the system band to be received by dividing it into a plurality of sub-bands.

The present embodiment is different from the embodiments in FIGS. 7 through 10 in that it adopts an RF filter 201, a variable local oscillator 202, image rejecting sections 205 and 206 and an A/D converter section 203 instead of the RF filter 77, the fixed local oscillating section 23, the image rejecting sections 75 and 76 and the A/D converter section 71.

It is noted that FIGS. 21 through 24 are different from each other in that the position where the image rejecting sections 205 and 206 are provided is different similarly to FIGS. 7 through 10. The image rejecting section 206 carries out the same operation with that of the image rejecting section 206 by digital processing.

Differing from the fixed local oscillating section 23 shown in FIGS. 7 through 10, the oscillating frequency of the variable local oscillating section 202 is variable. The orthogonal demodulating section 22 can divide the system bands (ch1 through ch8) into the plurality of sub-bands and implement the orthogonal demodulation and the A/D converter section 203 can implement the A/D converting process per sub-band by appropriately setting the oscillating frequency of the variable local oscillating section 202.

The signal from the antenna 1 is given to the RF filter 201. The RF filter 201 rejects the image component to the desirable wave and outputs it to the orthogonal demodulating section 22. The oscillating output of the local oscillating section 202 is given to the orthogonal demodulating section 22. The oscillating output of the variable local oscillating section 202 is variable. The variable local oscillating section 202 outputs the plurality of oscillating outputs for dividing the system band into a plurality of sub-bands and processing.

The orthogonal demodulating section 22 converts the inputted RF signal into a low frequency band, e.g., frequency in the vicinity of DC, per sub-band by using the local oscillating output.

Figure 21:
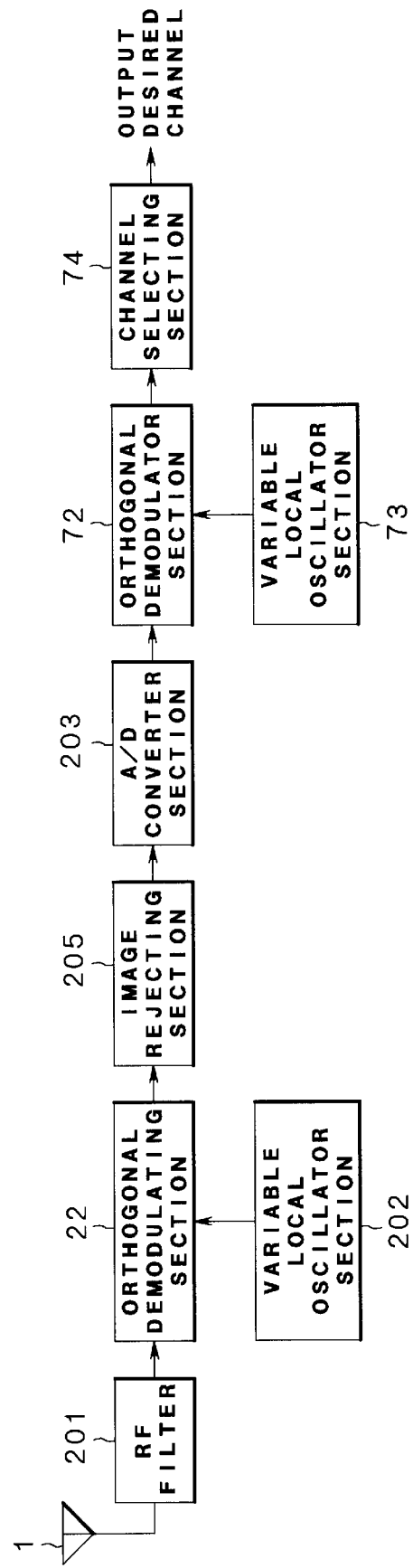
FIG. 21 is a block diagram showing another embodiment of the invention.

The output of the orthogonal demodulating section 22 is supplied to the image rejecting section 205 in FIG. 21. The image rejecting section 205 is a process following the orthogonal demodulating process of the orthogonal demodulating section 22 and rejects the image component of the output of the orthogonal demodulating section 22 to output to the A/D converter section 203. The A/D converter section 203 converts the output of the image rejecting section 205 into a digital signal to output to the orthogonal demodulating section 72.

Figure 22:
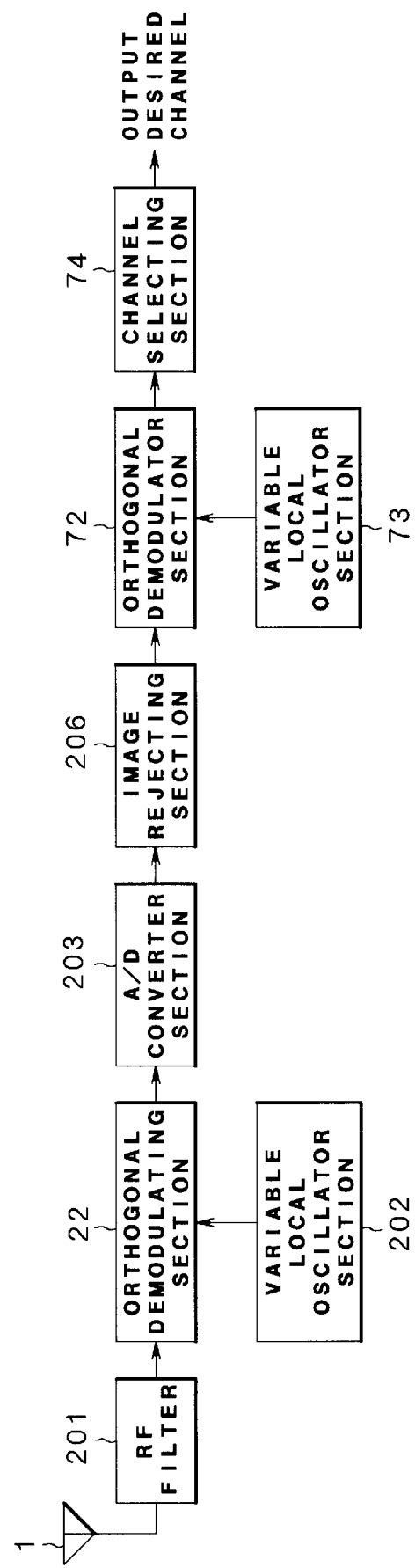
FIG. 22 is a block diagram showing another embodiment of the invention.
Figure 23:
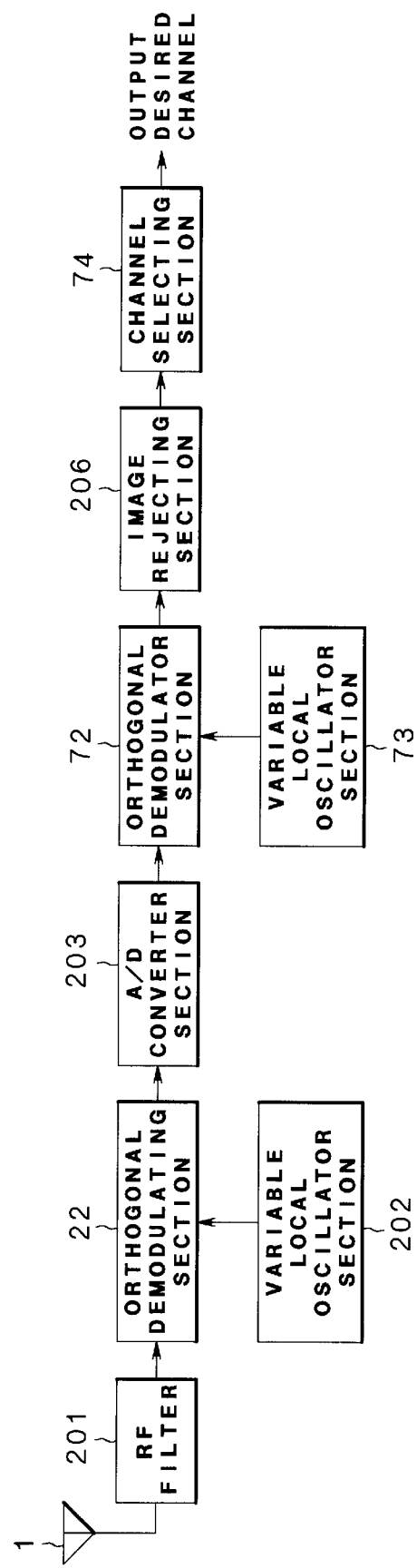
FIG. 23 is a block diagram showing another embodiment of the invention.
Figure 24:
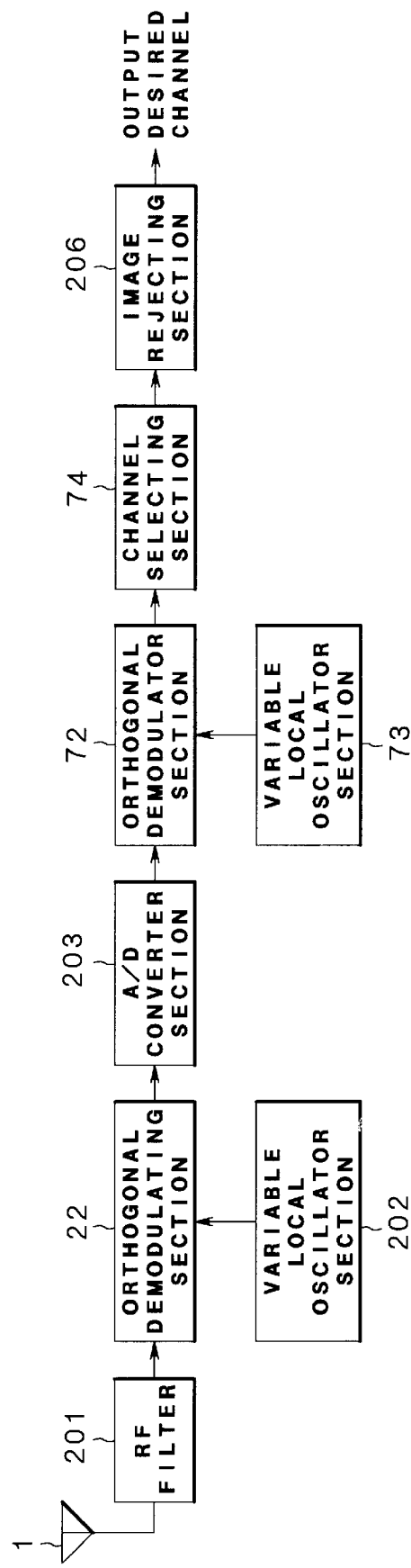
FIG. 24 is a block diagram showing another embodiment of the invention.

In FIGS. 22 through 24, the output of the orthogonal demodulating section 22 is given to the A/D converter section 203 to convert into a digital signal. The output of the A/D converter section 203 is given to the image rejecting section 206 in FIG. 22. The image rejecting section 206 rejects the image component by means of digital processing. For instance, the process of the image rejecting section 206 is carried out as a process following the orthogonal demodulating process of the orthogonal demodulating section 22. The output of the image rejecting section 206 is supplied to the orthogonal demodulating section 72.

In FIGS. 23 and 24, the output of the A/D converter section 203 is given to the orthogonal demodulating section 72. In FIG. 23, the output of the orthogonal demodulating section 72 is given to the image rejecting section 206. The image rejecting section 206 is a process following the orthogonal demodulating process of the orthogonal demodulating section 72 and rejects the image component of the output of the orthogonal demodulating section 72 by means of digital processing to output to the channel selecting section 74.

In FIG. 24, the output of the orthogonal demodulating section 72 is given to the image rejecting section 206 via the channel selecting section 74. For instance, the process of the image rejecting section 206 is carried out as a process following the orthogonal demodulating process of the orthogonal demodulating section 72.

Because the orthogonal demodulating process is carried out per sub-band, the image rejecting sections 205 and 206 allow the band of the anti-aliasing filter to be set narrower than the embodiments in FIGS. 7 through 10.

The RF filter 201 may also have lower characteristics than that of the RF filter 77 in FIGS. 7 through 10 because the rear-stage processes are carried out per sub-band. In contrary, when a filter having the same characteristics with the RF filter 77 is used, an amount of attenuation of the image band of the RF filter 201 is improved.

The A/D converter section 203 also converts the output of the orthogonal demodulating section 22 or the image rejecting section 205 into a digital signal and outputs it to the image rejecting section 206 or the orthogonal demodulating section 72. The A/D converter section 203 can also converts the output into the digital signal per sub-band, so that the band to be converted is narrow.

Figure 25A:
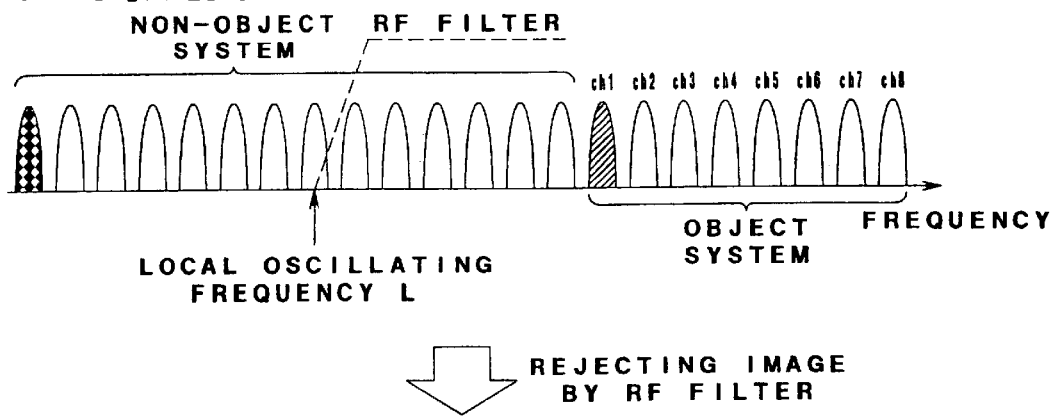
FIGS. 25A through 25D are spectrum diagrams for explaining the operation of the embodiments in FIGS. 21 through 24.
Figure 25B:
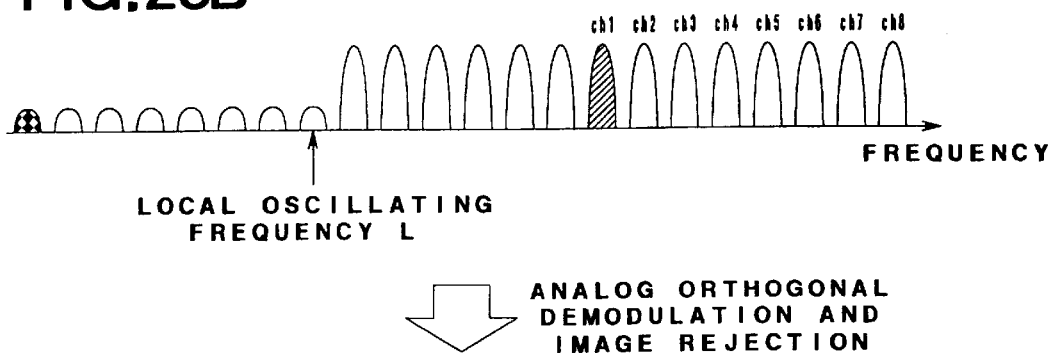
Figure 25C:
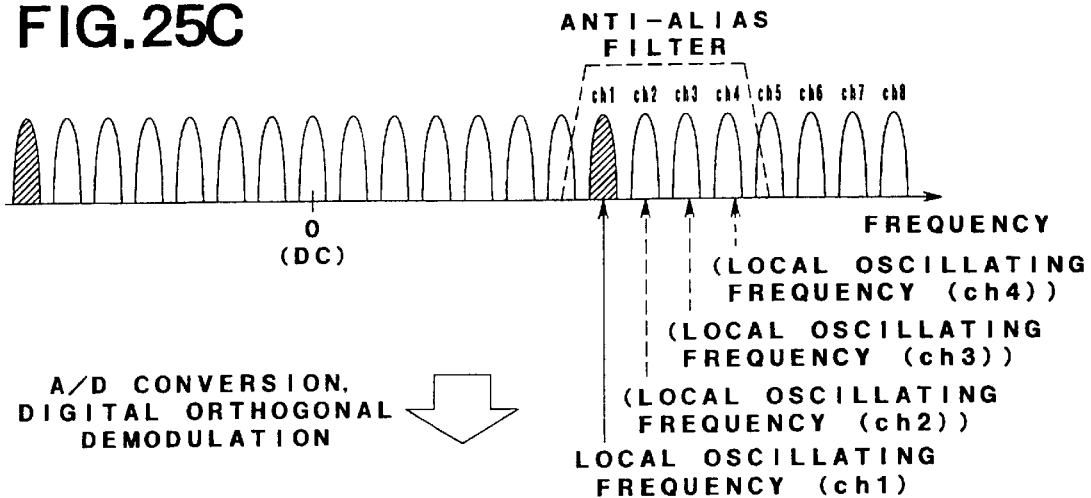
Figure 25D:
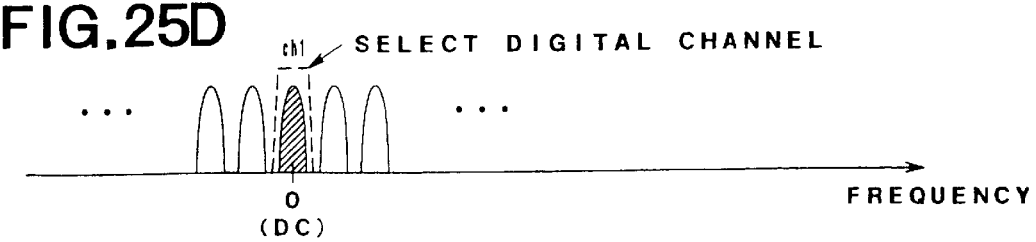
Figure 26A:
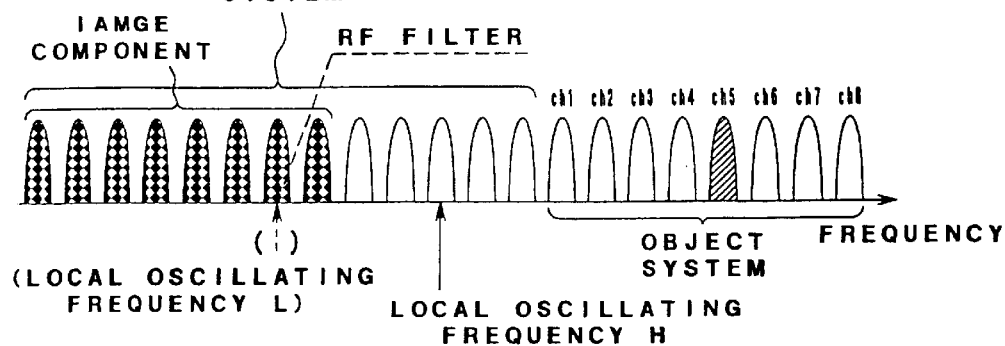
FIGS. 26A through 26D are spectrum diagrams for explaining the operation of the embodiments in FIGS. 21 through 24.
Figure 26B:
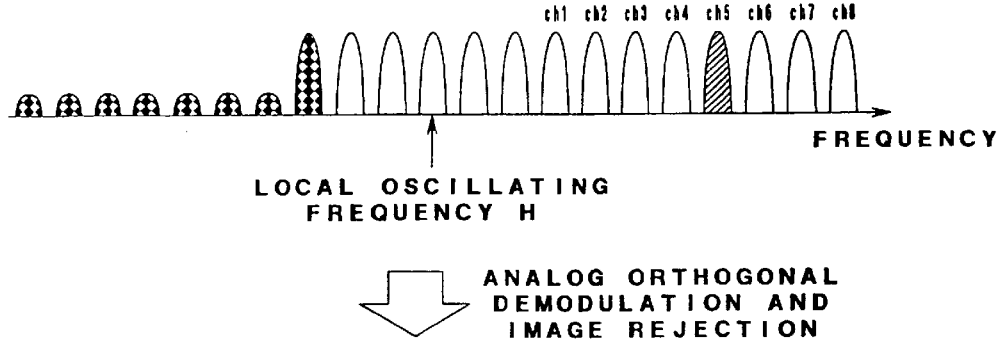
Figure 26C:
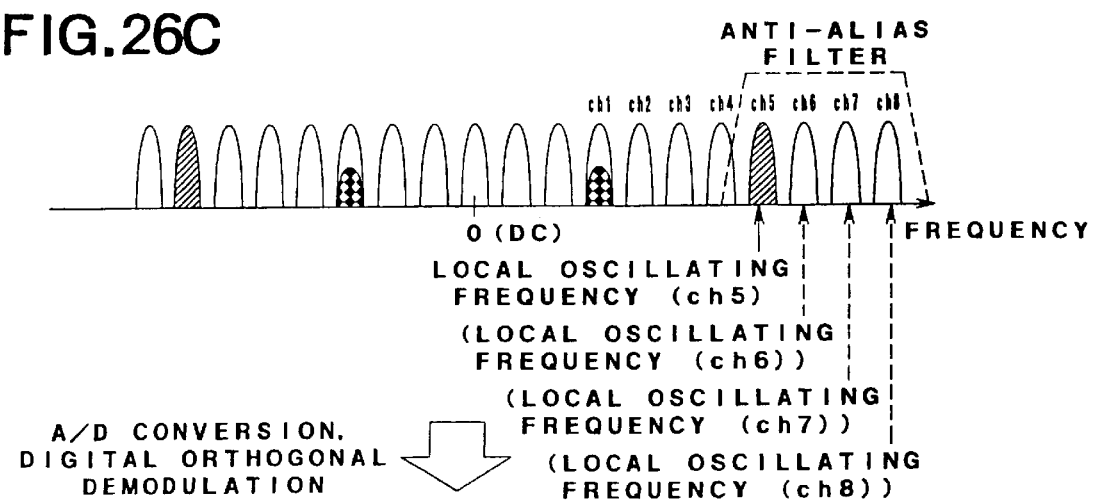
Figure 26D:
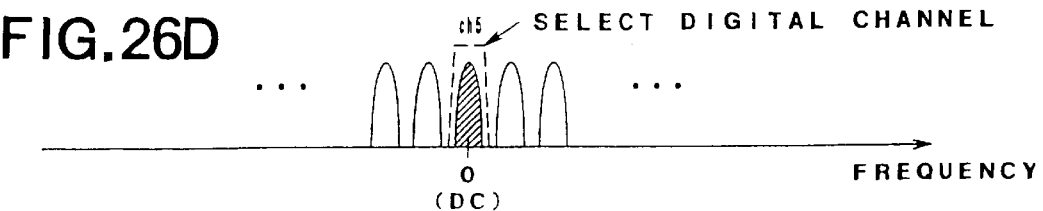

Next, the operation of the embodiment constructed as described above will be explained about the case of FIG. 21 with reference to the spectrum diagrams of FIGS. 25A through 25D and FIGS. 26A through 26D. FIGS. 25A and 26A show a received signal, FIGS. 25B and 26B show the output of the RF filter 201, FIGS. 25C and 26C show the output of the image rejecting section 205, and FIGS. 25D and 26D show the output of the channel selecting section 74. FIGS. 25A through 25D show a case of selecting either one channel among ch1 through ch4 and FIGS. 26A through 26D show a case of selecting either one channel among ch5 through ch8. A desirable wave is represented by a hatched wave and an image component is represented by a grid pattern in FIGS. 25A through 25D and FIGS. 26A through 26D.

Assume now that channels of a radio communication system to be received are channels 1 (ch1) through 8 (ch8) shown in FIGS. 25A and 26A. Assume also that ch1 or ch5 is a desirable wave and is selected and received among ch1 through ch8. In this case, ch1 through ch8 are divided into a plurality of sub-bands and analog orthogonal demodulation is carried out per each sub-band. For instance, when they are divided into the sub-bands of ch1 through ch4 and ch5 through ch8, the variable local oscillating section 202 outputs two oscillating frequencies.

That is, when one channel among ch1 through ch4 is to be selected and received, the frequency of the variable local oscillating section 202 is set at local oscillating frequency L as shown in FIG. 25A and when one channel among ch5 through ch8 is to be selected and received, the frequency of the variable local oscillating section 202 is set at local oscillating frequency H as shown in FIG. 26A.

The difference of frequency between the local oscillating frequency L and the local oscillating frequency H is set at frequency of difference of two sub-bands, i.e., at the frequency of difference between ch5 and ch1. The variable local oscillating section 202, in general, may output with the difference of frequency corresponding to a band width of a sub-band dividing an oscillating output of a number of sub-bands to be divided because the system band to be received is divided into the sub-bands.

Then, a band containing the image component of at least a desired signal is rejected by the RF filter 201, i.e., the image rejecting filter, in the channels of other systems not necessary to receive (non-object system). In this case, the structure of the RF filter 201 may be simplified because a room of 4 ch is produced in the low range side as compared to the case of FIGS. 11A through 11D. FIGS. 25B and 26B show the output of the RF filter 201 after implementing the image rejection. As shown by the grid pattern in FIGS. 25B and 26B, the image signal component is rejected.

The analog orthogonal demodulating section 22 converts all of ch1 through ch4 and ch5 through ch8 into the same frequency band as shown in FIGS. 25C and 26C by orthogonally demodulating ch1 through ch4 by using the local oscillating frequency L and by orthogonally demodulating ch5 through ch8 by using the local oscillating frequency H.

Accordingly, the common anti-aliasing filter (low-pass filter) may be used as the image rejecting section 205 in receiving the desirable channel among ch1 through ch4 and in receiving the desirable channel among ch5 through ch8. The image rejecting section 205 forms the anti-aliasing filter for the later A/D converter section 203 and the band may be halved as compared to the anti-aliasing filter forming the image rejecting section 75 in FIGS. 7 through 10.

The A/D converter section 203 bundles the output of the image rejecting section 205 as four channels of ch1 through ch4 and ch5 through ch8 to convert from analog to digital.

Then, in selecting either one channel among ch1 through ch4, the frequency of the variable local oscillating section 73 is tuned to the desirable channel among ch1 through ch4 as shown in FIG. 25C, the orthogonal demodulating section 72 implements the orthogonal demodulation in digital and the channel selecting section 74 selects the desirable channel (ch1 in FIGS. 25A through 25D) as shown in FIG. 25D.

In the same manner, in selecting either one channel among ch5 through ch8, the frequency of the variable local oscillating section 73 is tuned to the desirable channel among ch5 through ch8 as shown in FIG. 26C, the orthogonal demodulating section 72 implements the orthogonal demodulation in digital and the channel selecting section 74 selects the desirable channel (ch5 in FIGS. 26A through 26D) as shown in FIG. 26D.

It is noted that the image signal 22 of ch1 through ch8 is rejected by the RF filter 201, i.e., the image rejecting filter, before the analog orthogonal demodulating section 22 in the both cases when the local oscillating frequency L or the local oscillating frequency H is used (FIGS. 25A and 26A). The RF filter 201 is the same regardless of the local oscillating frequency L and the local oscillating frequency H.

Because the process on and after the analog orthogonal demodulating process is carried out by dividing into the sub-bands in the present embodiment as described above, the band of the image rejecting section 205 may be set to be narrow corresponding to a number of sub-bands. Accordingly, the power consumption of the A/D converter section 203 may be lowered because the signal passing band of the A/D converter section 203 may be narrowed.

Further, as a result of reduction of the required band, a room is produced in the image rejecting characteristics of the RF filter 201, thus improving the amount of attenuation in the image band.

It is noted that the desirable wave is selected among a small number of channels (four channels in the cases of FIGS. 25A through 25D and FIGS. 26A through 26D) by the digital filter as compared to the case of selecting a desirable channel by using a digital filter by receiving ch1 through ch8 in batch. Accordingly, although the general purposefulness decreases as compared to the embodiments in FIGS. 7 through 10, it keeps the flexibility of capable of selecting a channel by the programmable digital filter by receiving a plurality of channels in batch. That is, because the band width and cutoff frequency of the digital filter of the channel selecting section 74 may be flexibly controlled and changed by controlling from the outside, it is capable of readily accommodating to a plurality of systems having different band widths. The effect that two image rejecting sections 205 and 206 allow the image rejecting effect to be fully obtained is also the same with the embodiments shown in FIGS. 7 through 10.

Figure 27:
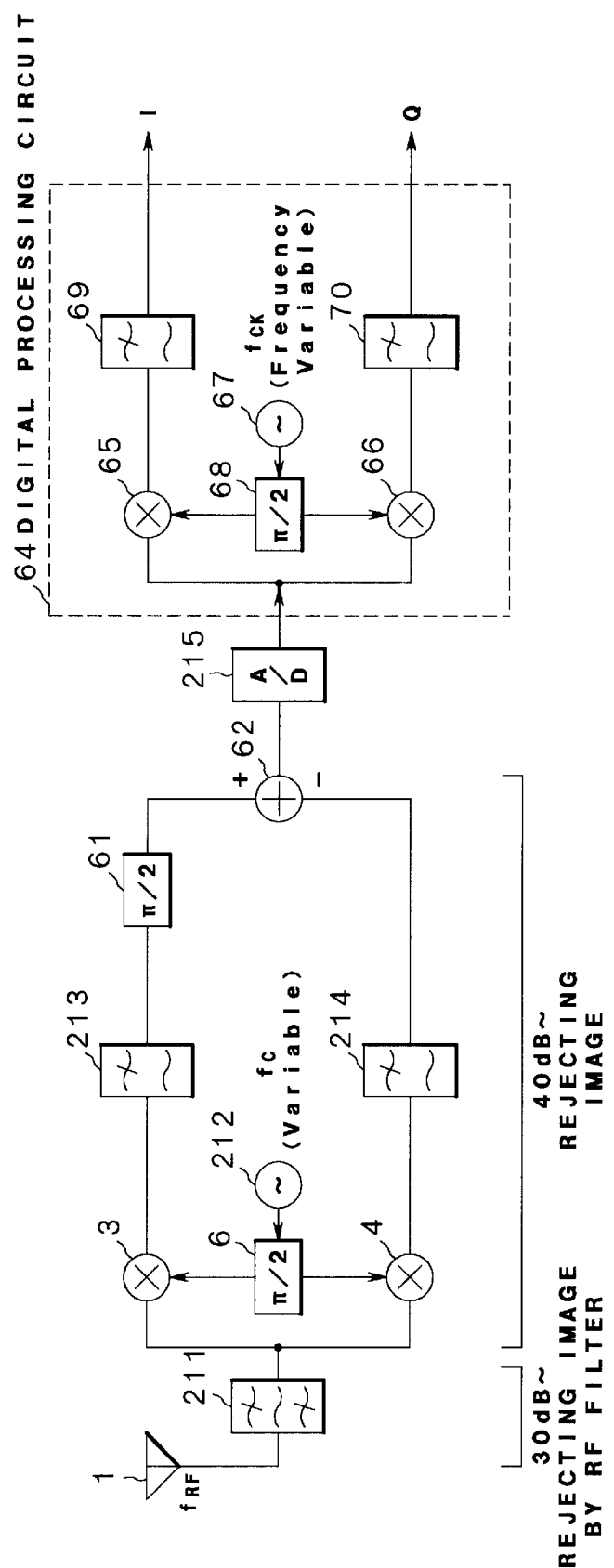
FIG. 27 is a circuit diagram showing another embodiment of the invention.

FIG. 27 is a circuit diagram showing another embodiment of the invention and shows a concrete circuit of the embodiment in FIG. 21. In FIG. 27, the same structural elements with those in FIG. 12 are denoted by the same reference numerals and an explanation thereof will be omitted here.

The output of the antenna 1 is supplied to a band-pass filter 211 composing the RF filter 201. The band-pass filter 211 rejects the image component of the inputted signal and outputs it to the orthogonal demodulating section 22. A local oscillator 212 and the phase shifter 6 composing the variable local oscillating section 202 supply the local oscillating output, i.e., the reference signal, to the mixers 3 and 4. The mixers 3 and 4 orthogonally demodulate the inputted signal by using the local oscillating output to convert the frequency into the low band and to supply to the low-pass filters 213 and 214.

The low-pass filters 213 and 214 limit the band of the output of the mixers 3 and 4. The output of the low-pass filter 213 is supplied to a phase shifter 61 and the output of the low-pass filter 214 is supplied to an adder 62. The phase shifter 61 shifts the phase of the output of the low-pass filter 213 by $\pi/2$ and supplies it to the adder 62. The phase shifter 61 and the adder 62 compose the image rejecting section 205. The adder 62 supplies the output whose image component has been rejected to the A/D converter (A/D) 215 by subtracting the output of the low-pass filter 214 from the output of the phase shifter 61. The A/D converter 215 converts the signals of all inputted channels into digital signals in batch and then outputs them to multipliers 65 and 66 of the digital processing section 64.

In the embodiment constructed as described above, when the signal in FIG. 25A or 26A is induced at the antenna 1, the RF signal whose image component has been rejected may be obtained by the band-pass filter 201 as shown in FIGS. 25B and 26B. The oscillating frequency fC (L in FIGS. 25A through 25D and H in FIGS. 26A through 26D) of the local oscillator 212 is set on the outside of the band of all channels of the system to be received. The multipliers 3 and 4 then implements the orthogonal demodulation by using the oscillating output of the local oscillator 212 to convert the frequency into the low range per sub-band.

The output of the multiplier 3 is limited by the low-pass filter 213 and is then supplied to the adder 62 via the phase shifter 61. The output of the multiplier 4 is limited by the low-pass filter 214 and is then supplied to the adder 62. The image component is rejected further by the adding process of the adder 62. The analog orthogonally demodulated output shown in FIG. 25C or 26C may be obtained from the adder 62.

The output of the adder 62 is converted into a digital signal by the A/D converter 215 and is then supplied to the digital processing section 64. The multipliers 65 and 66 of the digital processing section 64 orthogonally demodulate the inputted signal by using the oscillating output corresponding to the desirable channel from the local oscillator 67. Thus, the orthogonally demodulated output as shown in FIG. 25D or 26D may be obtained. The low-pass filters 69 and 70 select only the desirable channel (ch1 in FIGS. 25A through 25D and ch5 in FIGS. 26A through 26D) and output as the I and Q signals.

Thus, the image rejection is carried out by the mixers 3 and 4, the variable local oscillator 212, the π/2 phase shifter 6, the low-pass filters 213 and 214, the π/2 phase shifter 61 and the adder 62 in the present embodiment in the same manner with what shown in FIG. 12. This structure forms the known image rejection mixer and can realize image rejection of about 30 dB. Accordingly, it is possible to achieve the image rejecting degree of 60 to 70 dB or more by the whole receiver together with the image rejecting degree (30 to 40 dB) of the band-pass filter 211. Further, the structure of the band-pass filter 211, the low-pass filters 213 and 214 and the A/D converter 215 may be simplified because the processing is carried out per sub-band by using the variable local oscillator 212.

Figure 28:
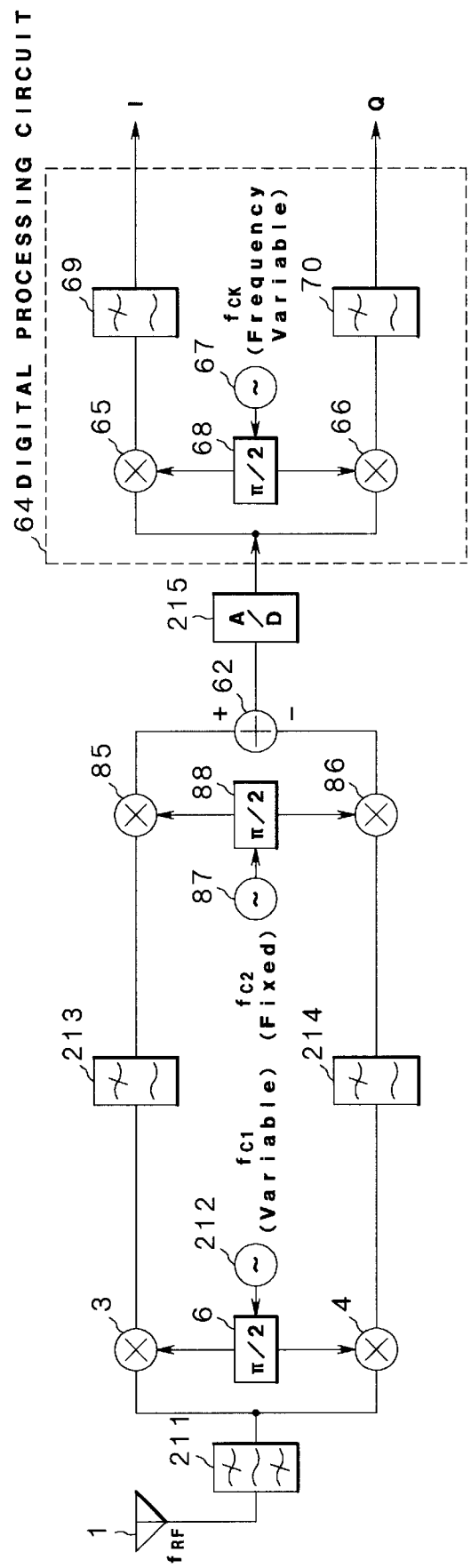
FIG. 28 is a circuit diagram showing another embodiment of the invention.

FIG. 28 is a circuit diagram showing another embodiment of the invention. In FIG. 28, the same structural elements with those in FIGS. 13 and 27 are denoted by the same reference numerals and an explanation thereof will be omitted here.

The present embodiment is what the function of the π/2 phase shifter 61 in FIG. 12 is realized by using a fixed local oscillator 87, mixers 85 and 86 and a π/2 phase shifter 88. The fixed local oscillator 87 oscillates at predetermined oscillating frequency fC2 and outputs the oscillating output to the phase shifter 88. The phase shifter 88 shifts the oscillating output by π/2 and supplies the oscillating outputs which are inverted from each other to the multipliers 85 and 86. The multipliers 85 and 86 multiply the outputs of the low-pass filters 213 and 214 with the oscillating outputs from the phase shifter 88 and output them to the adder 62.

In the embodiment constructed as described above, the outputs of the low-pass filters 213 and 214 are given to the multipliers 85 and 86 to be supplied to the adder 62. Thus, the image component may be rejected also by the adder 62. That is, similarly to the embodiment in FIG. 27, the image rejection mixer may be constructed from the input of the mixers 3 and 4 to the output of the adder 62 also in the embodiment in FIG. 28. It is also possible to simplify the structure of the band-pass filter 211, the low-pass filters 213 and 214 and the A/D converter 215 because the processing is carried out per sub-band.

Figure 29:
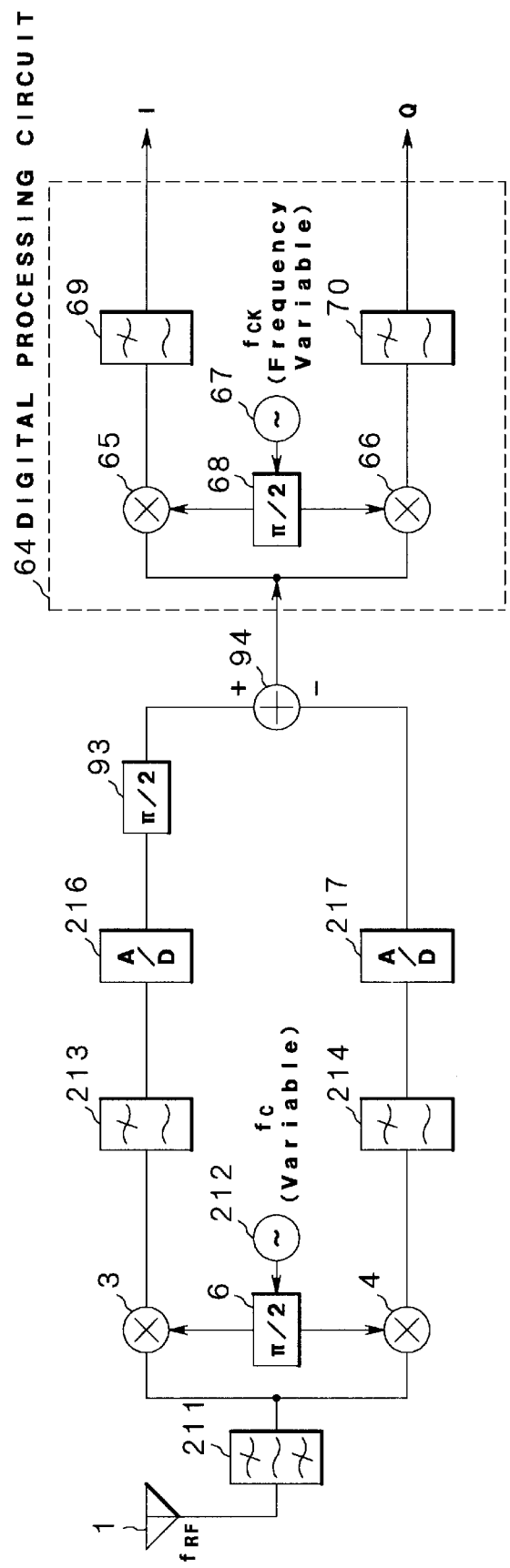
FIG. 29 is a circuit diagram showing another embodiment of the invention.

FIG. 29 is a circuit diagram showing another embodiment of the invention and shows a concrete circuit of the embodiment in FIG. 22. In FIG. 29, the same structural elements with those in FIGS. 14 and 27 are denoted by the same reference numerals and an explanation thereof will be omitted here.

The present embodiment is different from the embodiment in FIG. 27 in that it adopts A/D converters 216 and 217 instead of the A/D converter 63 and a phase shifter 93 and an adder 94 instead of the phase shifter 61 and the adder 62, respectively. The A/D converters 216 and 217 convert the outputs of the low-pass filters 213 and 214 into digital signals and output them to the phase shifter 93 or the adder 94, respectively. The phase shifter 93 outputs the output of the A/D converter 216 to the adder 94 after shifting the phase by π/2 by digital processing. The adder 94 subtracts the output of the A/D converter 217 from the output of the phase shifter 93 and outputs the result of subtraction to the digital processing section 64. That is, the present embodiment is what the phase shifter 93 which corresponds to the π/2 phase shifter 61 in FIG. 27 and thereafter is constructed in digital. The phase shifter 93 and the adder 94 reject the image component.

The operation of the embodiment constructed as described above is different from that of the embodiment in FIG. 27 only in that the image component is rejected after digitally converting the output of the low-pass filters 213 and 214.

Although the present embodiment is similar to the embodiment in FIG. 27 functionally, the π/2 phase shifter whose band is wider than the analog π/2 phase shifter 61 may be readily constructed because the phase shifter 93 is structured in digital. However, it consumes more power because it requires two A/D converters 216 and 217. It is noted that it is apparent that the same effect may be obtained by providing an analog π/2 phase shifter before the A/D converters 216 and 217 instead of the π/2 phase shifter 93 in the arrangement in FIG. 29.

Figure 30:
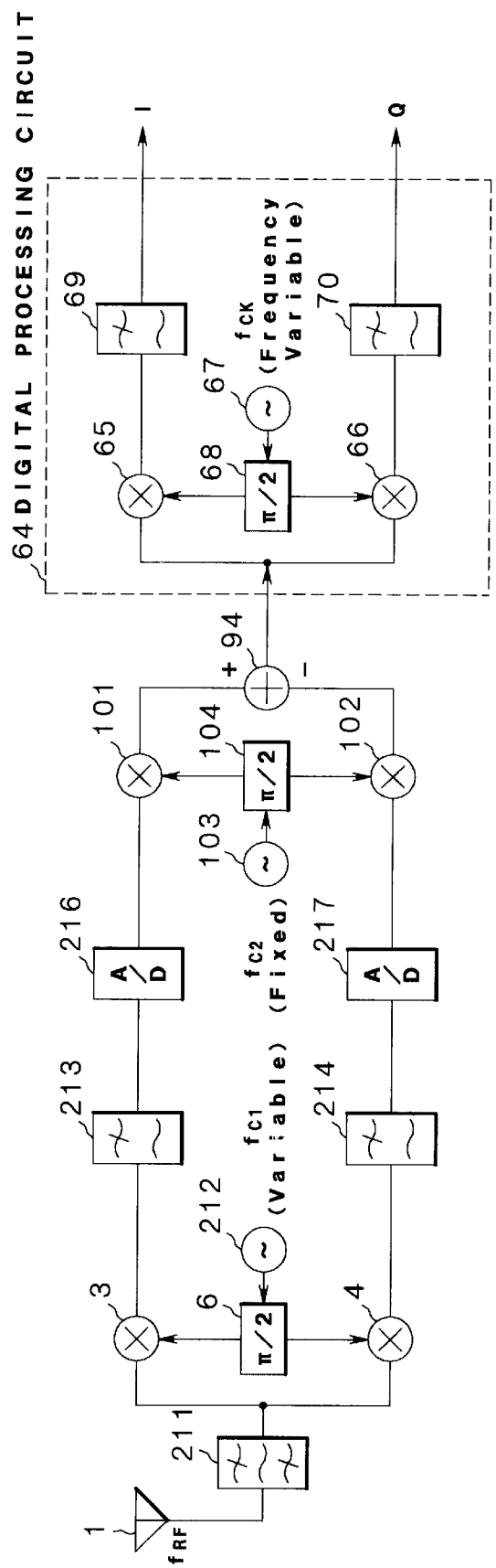
FIG. 30 is a circuit diagram showing another embodiment of the invention.

FIG. 30 is a circuit diagram showing another embodiment of the invention. In FIG. 30, the same structural elements with those in FIGS. 15 and 29 are denoted by the same reference numerals and an explanation thereof will be omitted here.

The present embodiment is what the function of the π/2 phase shifter 93 in FIG. 29 is realized by using a fixed local oscillator 103, mixers 101 and 102 and a π/2 phase shifter 104 structured in digital. The fixed local oscillator 103 oscillates at predetermined oscillating frequency fC2 and outputs the oscillating output to the phase shifter 104. The phase shifter 104 shifts the oscillating output by π/2 and supplies the oscillating outputs which are inverted from each other to multipliers 101 and 102. The multipliers 101 and 102 multiply the outputs of the A/D converters 216 and 217 with the oscillating outputs from the phase shifter 104 and output them to the adder 94.

In the embodiment constructed as described above, the outputs of the A/D converters 216 and 217 are given to the multipliers 101 and 102 and are supplied to the adder 94 in the same phase. Thus, the image component may be rejected also by the adder 94. That is, the image rejection is realized by the fixed local oscillator 103, the mixers 101 and 102, the π/2 phase shifter 104 and the adder 94 in the embodiment in FIG. 30.

Thus, the same effect with that of the embodiment in FIG. 29 may be obtained also by the present embodiment.

Figure 31:
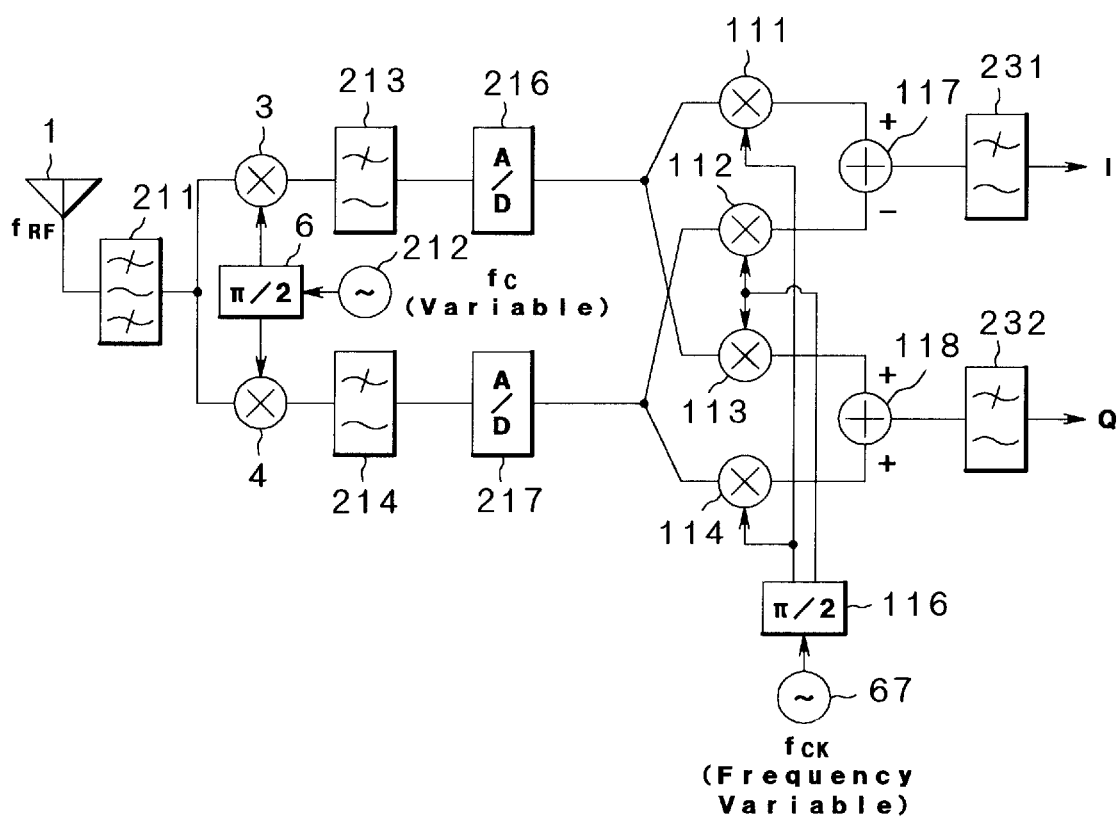
FIG. 31 is a circuit diagram showing another embodiment of the invention.

FIG. 31 is a circuit diagram showing another embodiment of the invention and shows a concrete circuit of the embodiment in FIG. 23. In FIG. 31, the same structural elements with those in FIGS. 16 and 29 are denoted by the same reference numerals and an explanation thereof will be omitted here.

In the present embodiment, the output of the A/D converter 216 is supplied to multipliers 111 and 113 and the output of the A/D converter 217 is supplied to multipliers 112 and 114. A phase shifter 116 shifts the phase of the oscillating output of the local oscillator 67 by $\pi/2$ and supplies the oscillating outputs to the multipliers 111 and 114 and the multipliers 112 and 113. The multipliers 111 through 114 implement the orthogonal demodulation by multiplying the inputted signal with the oscillating output from the phase shifter 116.

The outputs of the multipliers 111 and 112 are given to an adder 117 and the outputs of the multipliers 113 and 114 are given to an adder 118. The adder 117 rejects an image component by subtracting the outputs of the multipliers 111 and 112 and outputs the result to a low-pass filter 231. The adder 118 rejects an image component by adding the outputs of the multipliers 113 and 114 and outputs the result to a low-pass filter 232. The low-pass filters 231 and 232 select only a desirable channel from the inputted signals and output as I and Q signals.

In the embodiment constructed as described above, the image rejection is carried out by the adders 117 and 118. That is, an image rejection mixer is constructed by the sections from the input of the mixers 3 and 4 to the digital adders 117 and 118. When the antenna 1 receives the signal shown in FIG. 25A or 26A and ch1 or ch5 is to be selected and demodulated, the output of the band-pass filter 211 turns out as shown in FIG. 25B or 26B.

Then, the demodulated output of the desirable channel ch1 or ch5 whose image has been rejected as shown in FIG. 25D or 26D may be obtained from the outputs of the adders 117 and 118 without undergoing the state of FIG. 25C or 26B. The low-pass filters 231 and 232 select the desirable channel ch1 or ch5 and output as I and Q signals.

The same effect with the respective embodiments described above may be obtained also by the embodiment arranged as described above.

Figure 32:
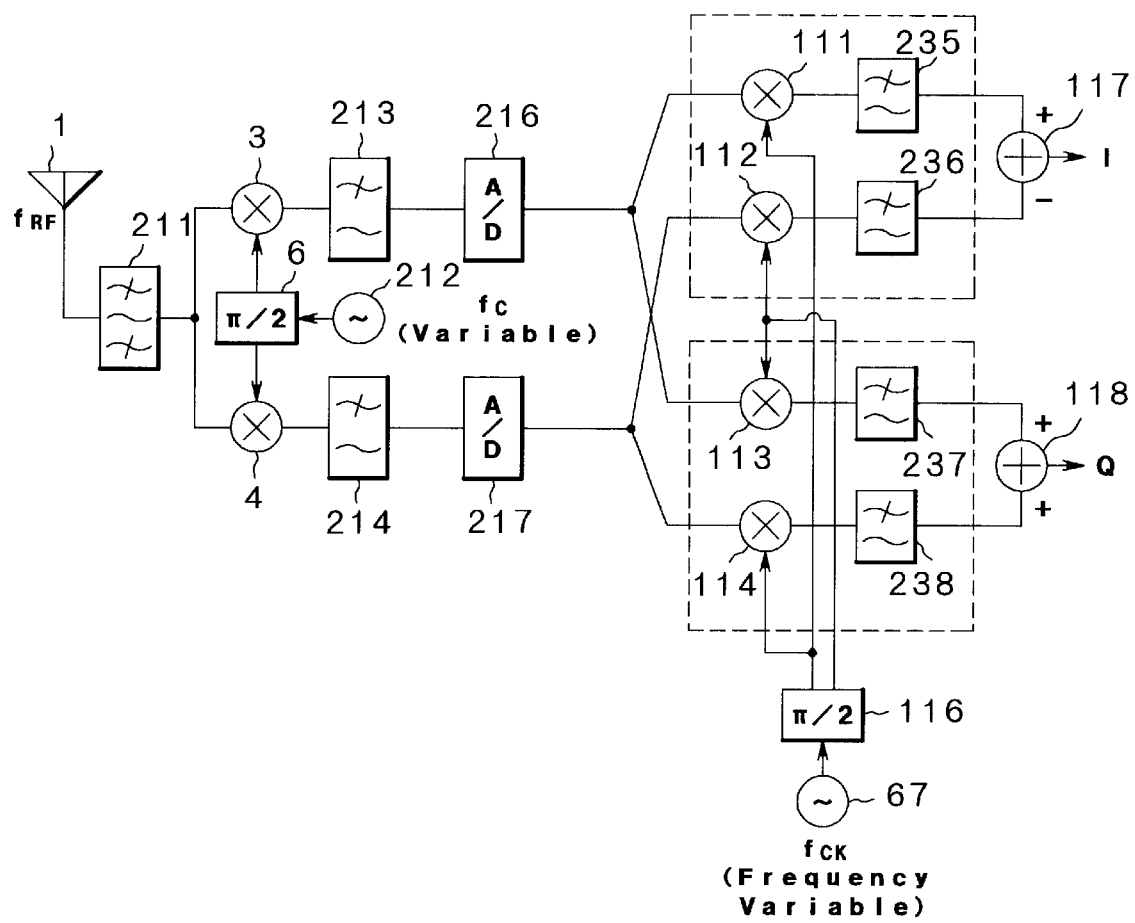
FIG. 32 is a circuit diagram showing another embodiment of the invention.

FIG. 32 is a circuit diagram showing another embodiment of the invention and shows a concrete circuit of the embodiment in FIG. 24. In FIG. 32, the same structural elements with those in FIGS. 17 and 31 are denoted by the same reference numerals and an explanation thereof will be omitted here.

The present embodiment is different from the embodiment in FIG. 31 in that it adopts low-pass filters 235 and 236 instead of the low-pass filter 231 and low-pass filters 237 and 238 instead of the low-pass filter 232. The low-pass filters 235 and 236 select the component of a desirable channel from the outputs of the multipliers 111 and 112, respectively, and output it to an adder 117. The low-pass filters 237 and 238 select the component of a desirable channel from the outputs of the multipliers 113 and 114, respectively, and output it to an adder 118. That is, the image suppressing section is provided at the last stage in the present embodiment.

The similar operation with that of the embodiment in FIG. 31 is carried out also in the present embodiment constructed as described above. Although an amount of arithmetic operations in the filtering section increases as compared to the embodiment in FIG. 31, the present embodiment is advantageous in that ready-made articles such as "HSP50027" of Haris Co. may be utilized in two digital processing sections surrounded by broken lines.

Thus, the present embodiment is advantageous in that the same effect with the embodiment in FIG. 31 may be obtained and that the wide-band receiver may be constructed readily by utilizing the existing digital processing sections.

Figure 33:
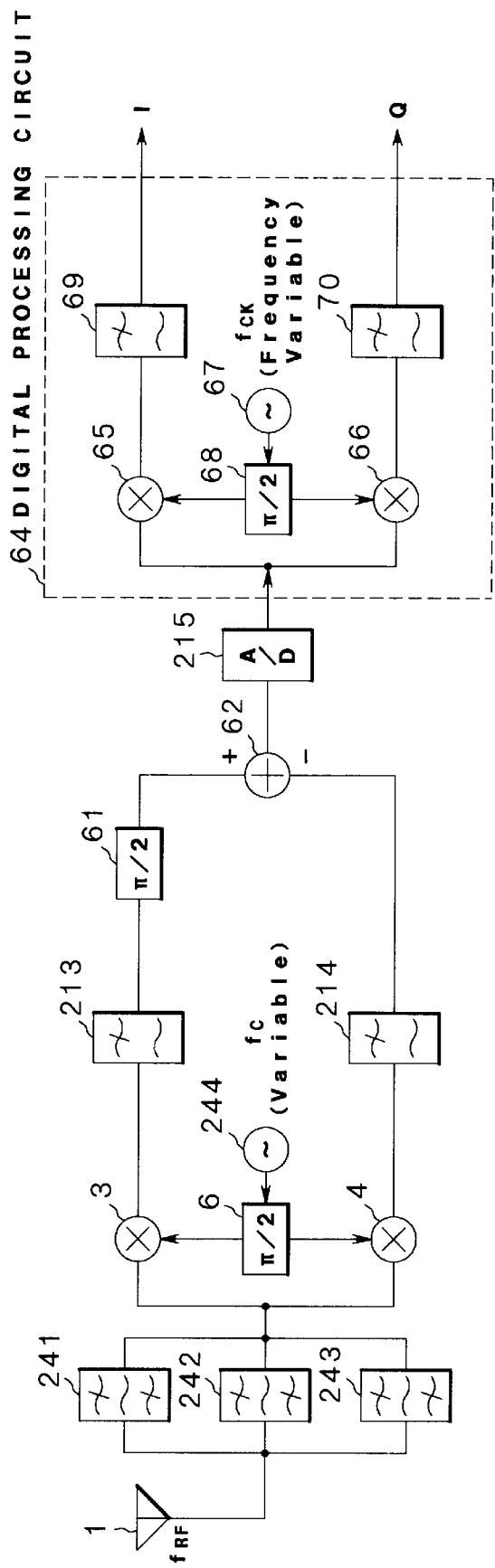
FIG. 33 is a circuit diagram showing another embodiment of the invention.

FIG. 33 is a circuit diagram showing another embodiment of the invention. In FIG. 33, the same structural elements with those in FIG. 27 are denoted by the same reference numerals and an explanation thereof will be omitted here. The present embodiment is a case of allowing a plurality of systems each having a plurality of channels to be received.

Assume now that the signal received by the antenna 1 is a signal containing systems A, B and C each having a plurality of channels. The present embodiment is arranged so as to change the oscillating frequency of the local oscillator per sub-band and to change the oscillating frequency of the local oscillator per system.

That is, the present embodiment is different from the embodiment in FIG. 27 in that it is provided with band-pass filters 241 through 243 instead of the band-pass filter 211 and adopts a local oscillator 244 instead of the local oscillator 212. The band-pass filters 241 through 243 correspond to the systems A, B and C, respectively, and are set at frequency bands different from each other. The local oscillator 244 oscillates at the oscillating frequency corresponding to the respective systems A, B and C and suitable for each sub-band.

Figure 34:
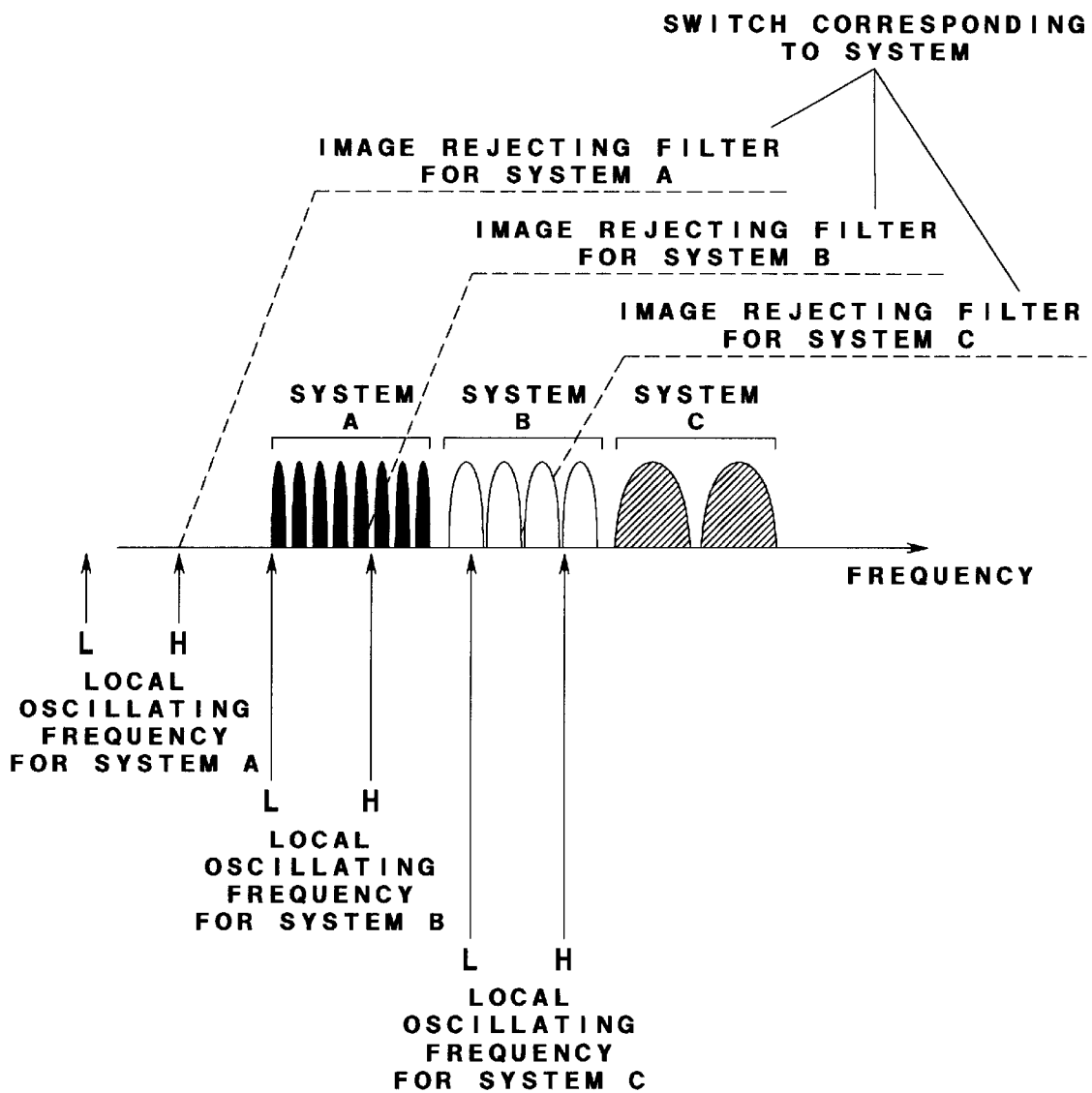
FIG. 34 is a spectrum diagram for explaining the embodiment in FIG. 33.
Figure 35A:
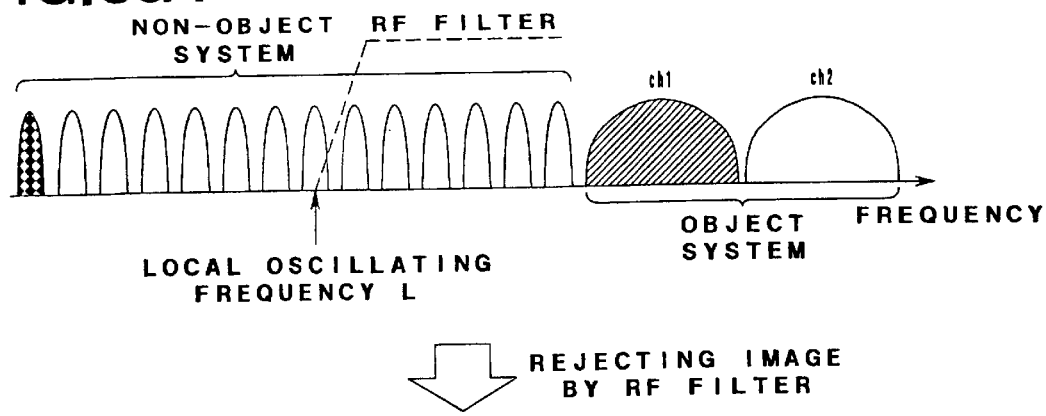
FIGS. 35A through 35D are spectrum diagrams for explaining the operation of the embodiments in FIG. 33.
Figure 35B:
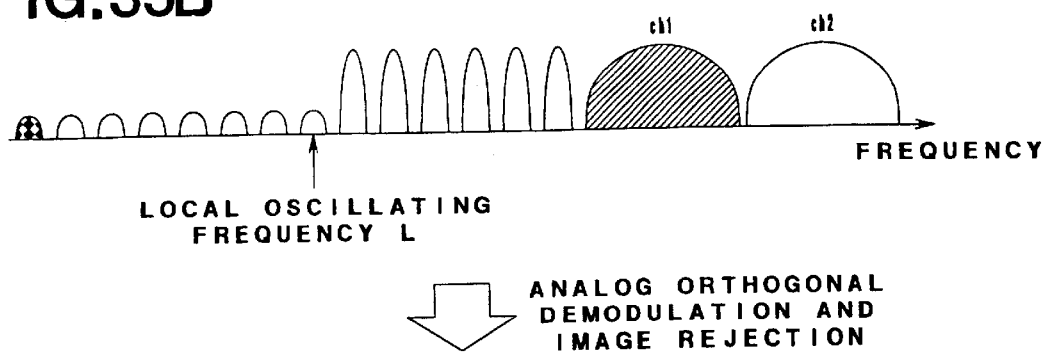
Figure 35C:
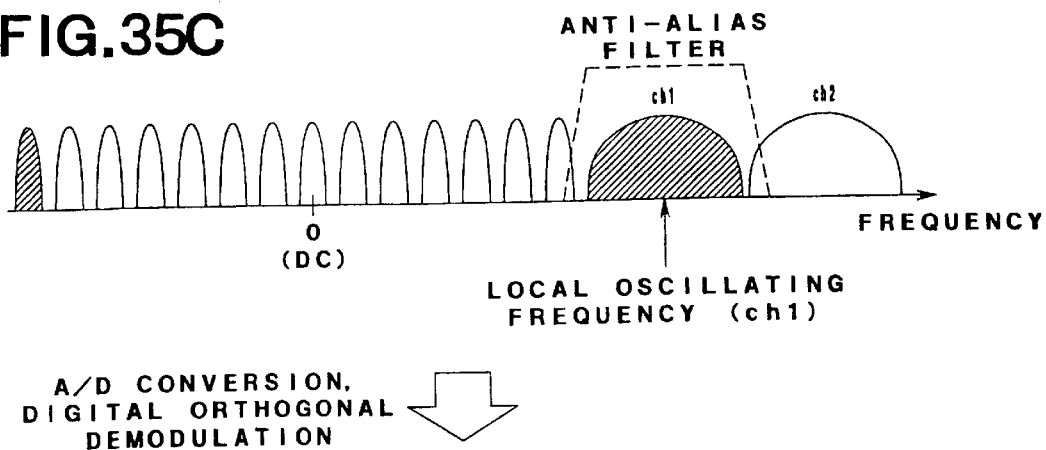
Figure 35D:
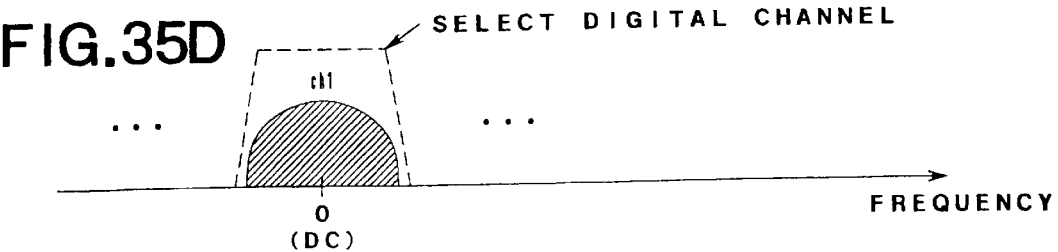
Figure 36A:
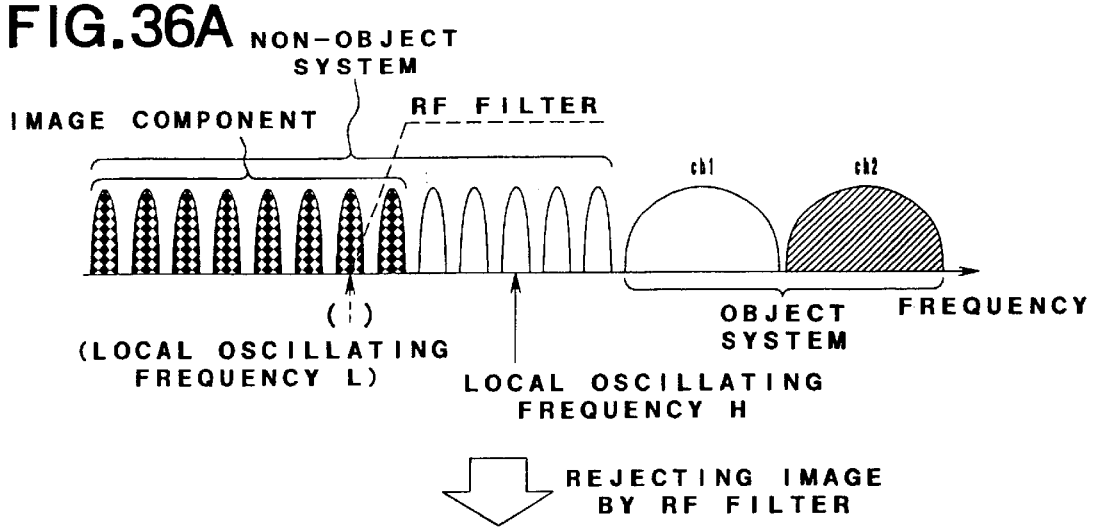
FIGS. 36A through 36D are spectrum diagrams for explaining the operation of the embodiments in FIG. 33.
Figure 36B:
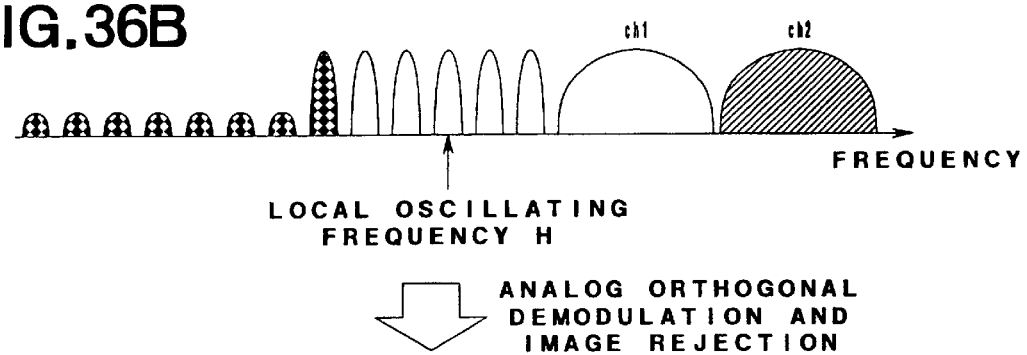
Figure 36C:
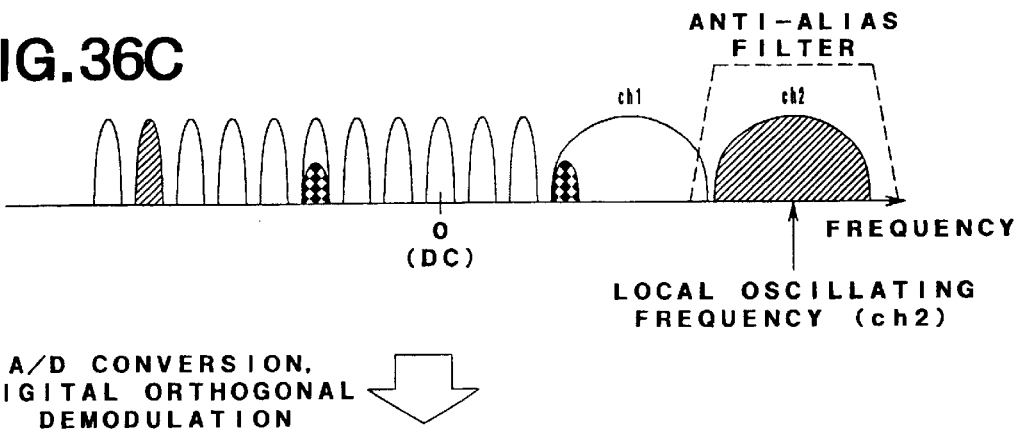
Figure 36D:
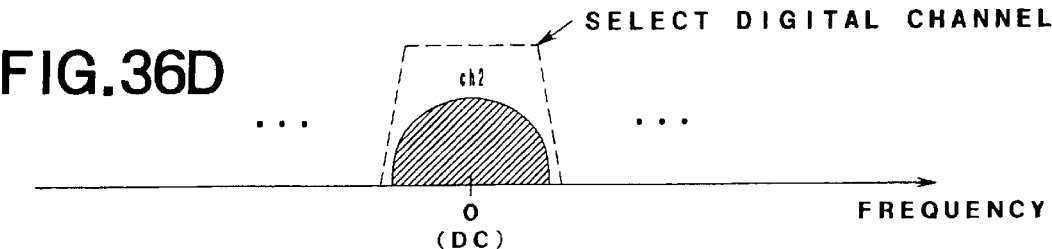
Figure 37A:
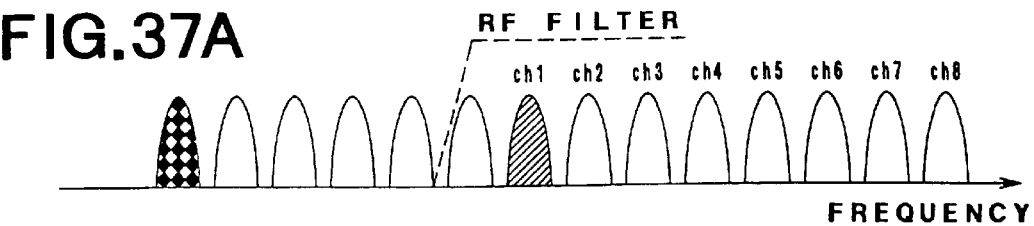
FIGS. 37A through 37D are spectrum diagrams for explaining the operation of the embodiment in FIG. 8.
Figure 37B:
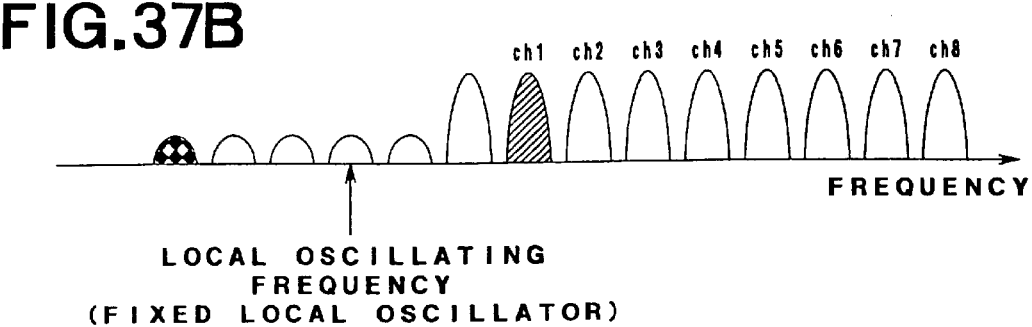
Figure 37C:
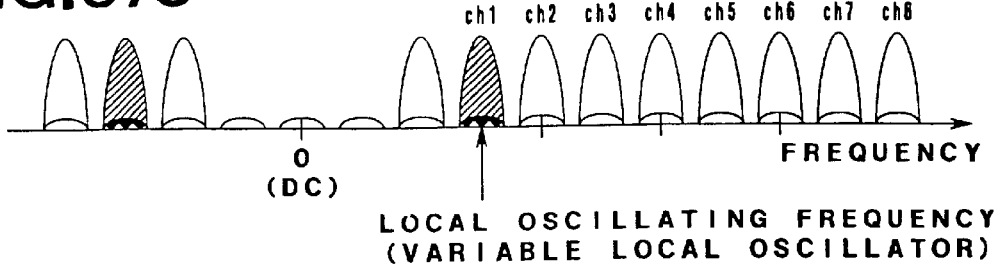
Figure 37D:
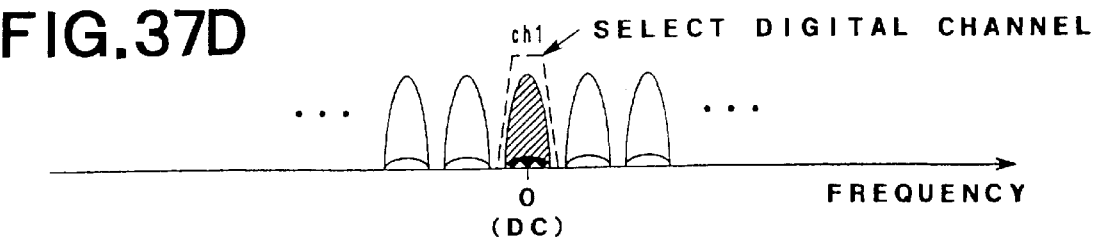
Figure 38A:
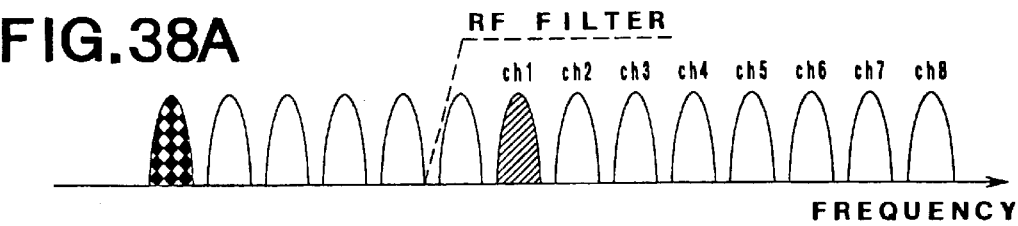
FIGS. 38A through 38D are spectrum diagrams for explaining the operation of the embodiment in FIG. 9.
Figure 38B:
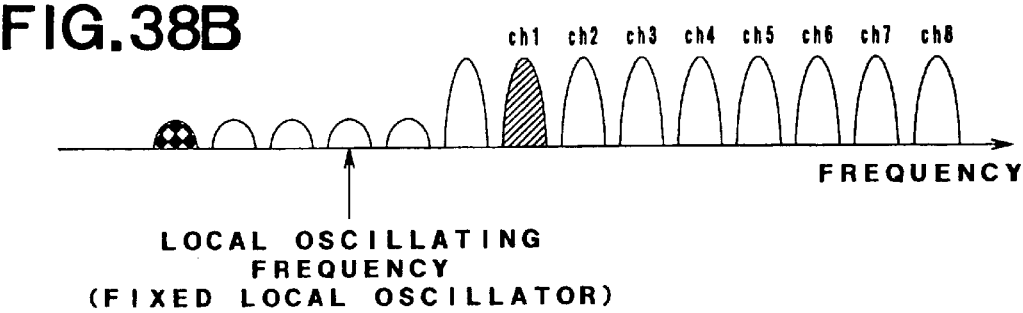
Figure 38C:
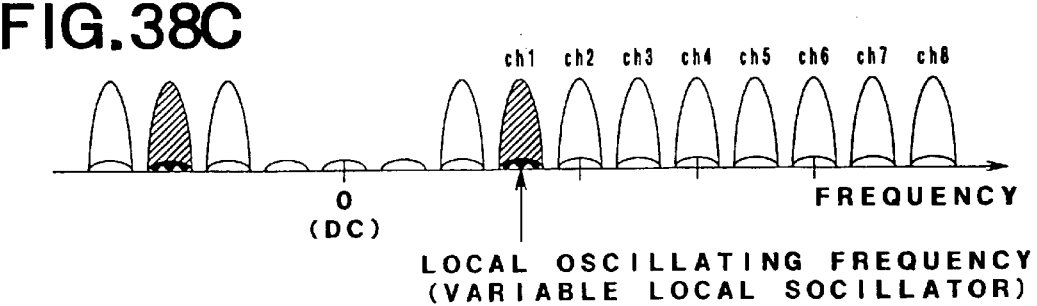
Figure 38D:
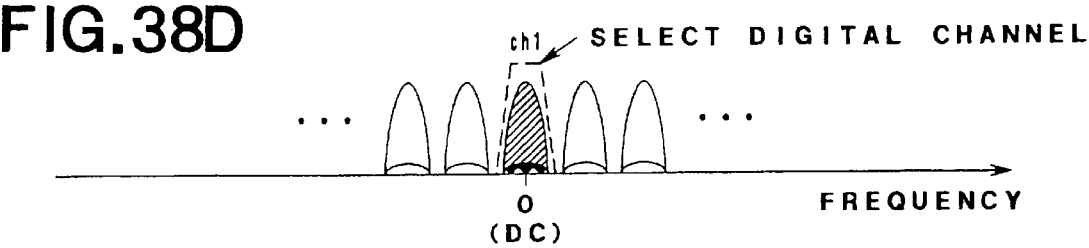
Figure 39A:
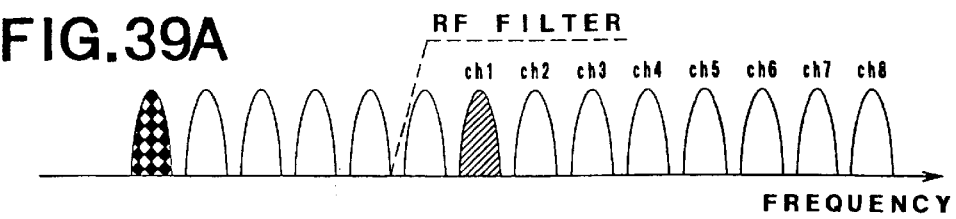
FIGS. 39A through 39D are spectrum diagrams for explaining the operation of the embodiment in FIG. 10.
Figure 39B:
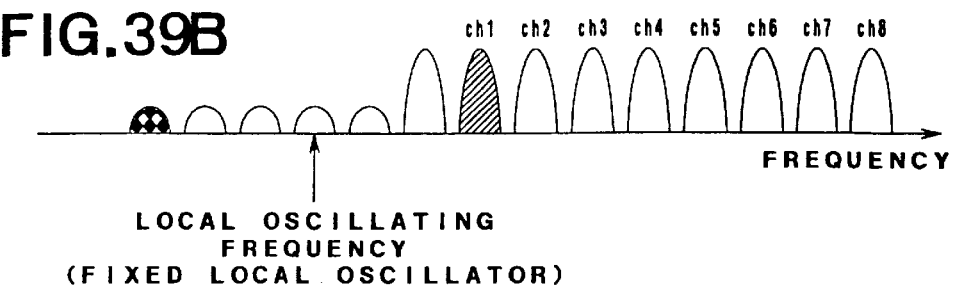
Figure 39C:
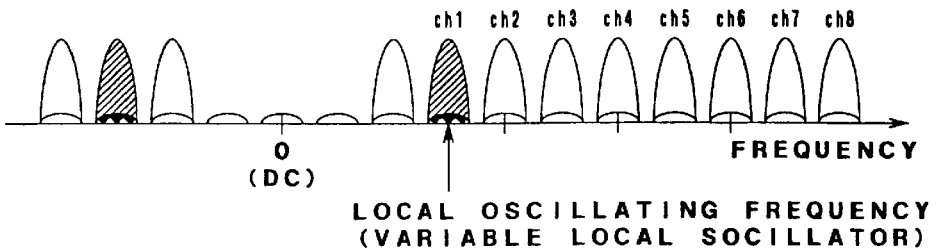
Figure 39D:
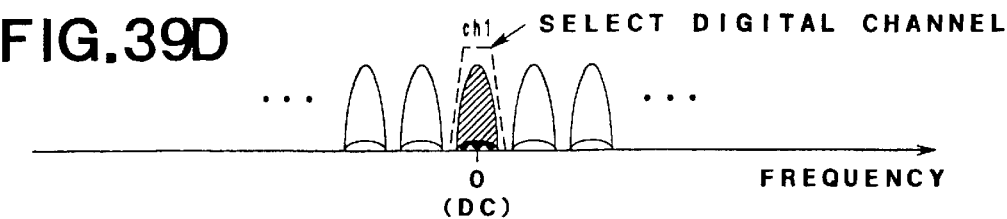
Figure 39E:
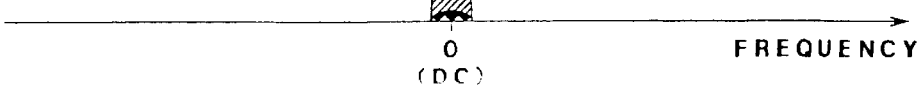

FIG. 34 is a spectrum diagram for explaining the oscillating frequency of a local oscillator 244 in FIG. 33. The case shown in FIG. 34 is what each system is divided into two sub-bands and the local oscillator 244 oscillates at two local oscillating frequencies of L and H per each system. It is noted that each oscillating frequency is set on the outside of the band of each system to be received.

Next, the operation of the embodiment constructed as described above will be explained with reference to FIGS. 35A through 35D and FIGS. 36A through 36D. FIGS. 35A through 35D and FIGS. 36A through 36D are spectrum diagrams for explaining the operation in applying to the plurality of systems. FIGS. 35A through 35D shows a case of selecting ch1 of the system C in FIG. 34 as the desirable wave and FIGS. 36A through 36D show a case of selecting ch2 of the system C in FIG. 34 as the desirable wave. The desirable wave is represented by a hatched wave and the image component is represented by a grid in FIGS. 35A through 35D and FIGS. 36A through 36D.

The signal received by the antenna 1 is supplied to the band-pass filters 241 through 243. The band-pass filters 241 through 243 reject the image component corresponding to the band of the respective systems A, B and C and output it to the multipliers 3 and 4. That is, the band-pass filter 241 rejects the image component in receiving the system A. Similarly to that, the band-pass filters 242 and 243 reject the image component in receiving the systems B and C.

The oscillating frequency of the local oscillator 244 is changed per each system A, B and C. Further, the local oscillator 244 oscillates by switching to two frequencies of local oscillating frequency L and local oscillating frequency H per each system in order to divide each band of the respective systems A, B and C into two sub-bands.

Assume now that the desired system C is composed of two channels of ch1 and ch2 as shown in FIG. 34. The variable local oscillator 244 is tuned to the local oscillating frequency L in selecting ch1 (FIGS. 35A through 35D) and is tuned to the local oscillating frequency H in selecting ch2 (FIGS. 36A through 36D).

Thus, each system is orthogonally demodulated in batch per sub-band of each system. The other operation is the same with that of the embodiment in FIG. 27.

That is, the channels are switched within each system not by the local oscillator 244 but by the digital processing of the variable local oscillator 67. Further, the channel is selected not by the analog filter but by the low-pass filters 69 and 70 in digital.

It is noted that it is effective to set the differential frequency between the local oscillating frequency L and the local oscillating frequency H at the channel interval or more of a system whose channel interval is the widest at least among the systems to be handled. It is because the frequency band of one channel must be A/D converted at least by the A/D converter and the A/D converter having the function of passing the band of at least one channel must be provided in the receiver.

The differential frequency of the local oscillating frequency L and the local oscillating frequency H is set at the channel interval of the system C whose band per one channel is the widest in the case of FIGS. 35A through 35D and FIGS. 36A through 36D.

Thus, the present embodiment allows the filtering characteristics to be readily achieved also in receiving the plurality of systems in the different bands having the plurality of channels, respectively.

It is noted that although the RF filter and the analog local oscillator have been changed corresponding to the structure of FIG. 27 in the embodiment of FIG. 33, it is apparent that the similar change may be made in applying to the embodiments in FIGS. 28 through 32.

Further, although the output frequency of the variable local oscillator 202 has been explaining citing only the local oscillating frequency L and the local oscillating frequency H in each embodiment described above, it is apparent that not only the two frequency outputs but also many more frequencies may be outputted corresponding to system bands to be handled.

It is also apparent that the processes after the A/D converting process may be realized by software processing in each embodiment described above.

It is obvious that the different embodiments may be made in a broad range based on the invention without departing the spirit and scope of the invention. The invention is not also limited by the specific embodiments and is determined solely by the appended claims.

What is claimed is:

1. A receiver, comprising:
    a filter which outputs an input signal containing a plurality of channels by rejecting an image band in a frequency converting process;
    a frequency converter having an analog orthogonal demodulator, which converts the frequency of said plurality of channels into the low range in batch when the input signal whose image band has been rejected by said filter is inputted;
    an image rejecting device which rejects and outputs said image band of the signal of said plurality of channels whose frequency has been converted by said frequency converter;
    an A/D converter which converts the signal of said plurality of channels which is the output of said image rejecting device into a digital signal; and
    a channel selector which selects a desirable channel out of the signals of said plurality of channels contained in the output of said A/D converter by digital processing;
    wherein said frequency converter divides the input signals containing said plurality of channels into a plurality of sub-bands and converts the frequency of the output of said filter into the low range in batch per said sub-band.

2. A receiver, comprising:
    a filter which outputs an input signal containing a plurality of channels by rejecting an image band in a frequency converting process;
    a frequency converter having an analog orthogonal demodulator, which converts the frequency of said plurality of channels into the low range in batch when the input signal whose image band has been rejected by said filter is inputted;
    an A/D converter which converts the signals of said plurality of channels whose frequency have been converted by said frequency converter into a digital signal;
    a channel selector which selects a desirable channel out of the signals of said plurality of channels contained in the output of said A/D converter by digital processing; and
    an image rejecting device which rejects said image band before, during or after said digital processing of said channel selector;
    wherein said frequency converter divides the input signals containing said plurality of channels into a plurality of sub-bands and converts the frequency of the output of said filter into the low range in batch per said sub-band.

3. A receiver, comprising:
    a filter which outputs an input signal containing a plurality of channels by rejecting an image band in a frequency converting process;
    a frequency converter having an analog orthogonal demodulator, which converts the frequency of said plurality of channels into the low range in batch when the input signal whose image band has been rejected by said filter is inputted:
    an image rejecting device which rejects and outputs said image band of the signal of said plurality of channels whose frequency has been converted by said frequency converter;
    an A/D converter which converts the signal of said plurality of channels which is the output of said image rejecting device into a digital signal; and
    a channel selector which selects a desirable channel out of the signals of said plurality of channels contained in the output of said AID converter by digital processing
    wherein said frequency converter comprises:
        a local oscillator which divides the band of said plurality of channels into a plurality of sub-bands and outputs a local oscillating output whose frequency has been changed at intervals of the band width or more of said sub-band; and
        an analog orthogonal demodulator which converts the frequency of the input signals of said plurality of channels into the low range in batch per each sub-band by multiplication of said local oscillating output and said input signals.

4. A receiver, comprising:
    a filter which outputs an input signal containing a plurality of channels by rejecting an image band in a frequency converting process;
    a frequency converter having an analog orthogonal demodulator, which converts the frequency of said plurality of channels into the low range in batch when the input signal whose image band has been rejected by said filter is inputted;
    an image rejecting device which rejects and outputs said image band of the signal of said plurality of channels whose frequency has been converted by said frequency converter;
    an A/D converter which converts the signal of said plurality of channels which is the output of said image rejecting device into a digital signal; and
    a channel selector which selects a desirable channel out of the signals of said plurality of channels contained in the output of said A/D converter by digital processing;

wherein said frequency converter comprises:
  a local oscillator which divides the band of said plurality of channels into a plurality of sub-bands and outputs a local oscillating output whose frequency is on the outside of the scope of the band of each sub-band and whose frequency has been changed at intervals of the band width or more of said sub-band; and
  an analog orthogonal demodulator which converts the frequency of the input signals of said plurality of channels into the low range in batch per each sub-band by multiplication of said local oscillating output and said input signals.

5. A receiver, comprising:
a filter which outputs an input signal containing a plurality of channels by rejecting an image band in a frequency converting process;
a frequency converter having an analog orthogonal demodulator, which converts the frequency of said plurality of channels into the low range in batch when the input signal whose image band has been rejected by said filter is inputted;
an A/D converter which converts the signals of said plurality of channels whose frequency have been converted by said frequency converter into a digital signal;
a channel selector which selects a desirable channel out of the signals of said plurality of channels contained in the output of said A/D converter by digital processing; and
an image rejecting device which rejects said image band before, during or after said digital processing of said channel selector;
wherein said frequency converter comprises:
  a local oscillator which divides the band of said plurality of channels into a plurality of sub-bands and outputs a local oscillating output whose frequency has been changed at intervals of the band width or more of said sub-band; and
  an analog orthogonal demodulator which converts the frequency of the input signals of said plurality of channels into the low range in batch per each sub-band by multiplication of said local oscillating output and said input signals.

6. A receiver, comprising:
a filter which outputs an input signal containing a plurality of channels by rejecting an image band in a frequency converting process;
a frequency converter having an analog orthogonal demodulator, which converts the frequency of said plurality of channels into the low range in batch when the input signal whose image band has been rejected by said filter is inputted;
an A/D converter which converts the signals of said plurality of channels whose frequency have been converted by said frequency converter into a digital signal;
a channel selector which selects a desirable channel out of the signals of said plurality of channels contained in the output of said A/D converter by digital processing; and
an image rejecting device which rejects said image band before, during or after said digital processing of said channel selector;
wherein said frequency converter comprises:
  a local oscillator which divides the band of said plurality of channels into a plurality of sub-bands and outputs a local oscillating output whose frequency is on the outside of the scope of the band of each sub-band and whose frequency has been changed at intervals of the band width or more of said sub-band; and
  an analog orthogonal demodulator which converts the frequency of the input signals of said plurality of channels into the low range in batch per each sub-band by multiplication of said local oscillating output and said input signals.

* * * * *